United States Patent
Kim et al.

(10) Patent No.: US 8,937,913 B2
(45) Date of Patent: Jan. 20, 2015

(54) METHOD FOR CONTROL CHANNEL DETECTION IN A MULTICARRIER SYSTEM

(75) Inventors: So Yeon Kim, Anyang-si (KR); Jae Hoon Chung, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 261 days.

(21) Appl. No.: 13/139,278

(22) PCT Filed: Dec. 11, 2009

(86) PCT No.: PCT/KR2009/007444
§ 371 (c)(1),
(2), (4) Date: Aug. 25, 2011

(87) PCT Pub. No.: WO2010/068069
PCT Pub. Date: Jun. 17, 2010

(65) Prior Publication Data
US 2011/0299489 A1 Dec. 8, 2011

Related U.S. Application Data

(60) Provisional application No. 61/260,854, filed on Nov. 13, 2009, provisional application No. 61/170,093, filed on Apr. 16, 2009, provisional application No. 61/167,162, filed on Apr. 7, 2009, provisional application No. 61/154,767, filed on Feb. 24, 2009, provisional application No. 61/121,543, filed on Dec. 11, 2008.

(51) Int. Cl.
*H04W 72/04* (2009.01)
*H04L 27/26* (2006.01)
*H04L 5/00* (2006.01)
*H04L 1/00* (2006.01)

(52) U.S. Cl.
CPC .............. *H04L 5/001* (2013.01); *H04L 1/0046* (2013.01); *H04L 1/0052* (2013.01); *H04L 1/0061* (2013.01); *H04L 1/0072* (2013.01); *H04L 5/0007* (2013.01); *H04L 5/0053* (2013.01); *H04L 5/0091* (2013.01)
USPC ........................................... 370/329; 370/522

(58) Field of Classification Search
None
See application file for complete search history.

(56) References Cited

U.S. PATENT DOCUMENTS

| | | | | |
|---|---|---|---|---|
| 8,238,475 | B2 * | 8/2012 | Malladi et al. | 375/316 |
| 2005/0190728 | A1 | 9/2005 | Han et al. | |
| 2008/0225786 | A1 * | 9/2008 | Han et al. | 370/329 |
| 2009/0154607 | A1 * | 6/2009 | Lindoff et al. | 375/341 |
| 2010/0227569 | A1 * | 9/2010 | Bala et al. | 455/73 |

FOREIGN PATENT DOCUMENTS

KR 1020060042646 5/2006

* cited by examiner

*Primary Examiner* — Kevin C Harper
*Assistant Examiner* — Derrick V Rose
(74) *Attorney, Agent, or Firm* — Lee, Hong, Degerman, Kang & Waimey

(57) ABSTRACT

The present invention relates to a method and device for reducing the level of blind decoding complexity when detecting a control channel in a broadband wireless access system supporting multicarrier operation. Examples of the present invention disclose methods for the effective blind decoding of a control channel using an explicit method and implicit methods when sending a control channel based on multicarrier operation as with a control channel for transmitting downlink or uplink allocation information under carrier aggregation conditions.

18 Claims, 16 Drawing Sheets

(a) CONTROL-PLANE PROTOCOL STACK (b) USER-PLANE PROTOCOL STACK (a)

(b)

(a)

(b)

(a)

(b)

METHOD FOR CONTROL CHANNEL DETECTION IN A MULTICARRIER SYSTEM

CROSS-REFERENCE TO RELATED APPLICATIONS

This application is the National Stage filing under 35 U.S.C. 371 of International Application No. PCT/KR2009/007444, filed on Dec. 11, 2009, which claims the benefit of U.S. Provisional Application Ser. Nos. 61/260,854, filed on Nov. 13, 2009, 61/170,093, filed on Apr. 16, 2009, 61/167,162, filed on Apr. 7, 2009, 61/154,767, filed on Feb. 24, 2009, and 61/121,543, filed on Dec. 11, 2008, the contents of which are incorporated by reference herein in their entirety.

TECHNICAL FIELD

The present invention relates to a method and apparatus for detecting a control channel in a multi-carrier broadband wireless access system and more particularly, to reduction of the blind decoding complexity of a user equipment in detecting a control channel.

BACKGROUND ART

A 3GPP LTE ($3^{rd}$ Generation. Partnership Project Long Term Evolution; hereinafter, referred to as "LTE") communication system as an example of a mobile communication system to which the present invention is applicable will be described schematically.

FIG. 1 is a schematic view illustrating the configuration of an E-UMTS network as an example of a mobile communication system.

An E-UMTS (Evolved Universal Mobile Telecommunication System) system is an evolution of the legacy UMTS Universal Mobile Telecommunication System) system. The 3GPP is working on the basic standardization of the E-UMTS system. In general, the E-UMTS system is also called an LTE system.

The E-UMTS network may be largely divided into an E-UTRAN 101 and a CN (Core Network) 102. The E-UTRAN (Evolved-UMTS Terrestrial Radio Access Network) 101 includes a UE (User Equipment) 103, eNode Bs or eNBs 104, an AG (Access gateway) 105 which resides at an end of the network in connection to an external network. The AG 105 may be divided into a part for processing user traffic and another part for processing control traffic. In this case, an AG for processing new user traffic may communicate with an AG for processing control traffic via a new interface.

One eNB may manage one or more cells. An interface for transmitting user traffic or control traffic may be established between eNBs. The CN 102 may be comprised of the AG 105, a node for user registration of the UE 103, etc. An interface for distinguishing the E-UTRAN 101 from the CN 102 may be used.

Radio interface protocol layers between a UE and a network may be classified into a first layer (L1), a second layer (L2), and a third layer (L3) based on the lowest three layers of the known OSI (Open System Interconnection) reference model in communication systems. Among them, a PHY layer at L1 provides an information transfer service though physical channels and an RRC (Radio Resource Control) layer at L3 controls radio resources between the UE and the network. For this purpose, the RRC layer exchanges RRC messages between the UE and the network. The RRC layer may be distributed across network nodes such as the eNB 104 and the AG 105, or may be confined to the eNB 104 or the AG 105.

The development of wireless communication technology has reached even LTE based on WCDMA. Nonetheless, demands and expectations of users and service providers are on the increase. In addition, considering other wireless access technologies under development, a new technology evolution is needed to have future competitiveness. Per-bit cost reduction, increased service availability, flexible frequency use, a simple structure and an open interface, UEs' appropriate power consumption, etc. are requirements to be fulfilled.

The 3GPP has recently worked on standardization of a successor to LTE. In the specification, the successor to LTE will be referred to as "LTE-Advanced" or "LTE-A". One of main differences between the LTE system and the LTE-A system is a system bandwidth. The LTE-A system aims to support a broadband of up to 100 MHz. For this purpose, the LTE-A system adopts carrier aggregation or bandwidth aggregation to achieve a broadband using a plurality of component subcarriers.

DISCLOSURE

Technical Problem

An object of the present invention devised to solve the conventional problem is to provide a method for reducing the blind decoding complexity of detecting a control channel at a UE.

Another object of the present invention is to provide a method for reducing the blind decoding complexity of a UE by explicit or implicit signaling.

Another object of the present invention is to provide a method for providing a fallback mode to enable a UE to decode a control channel even though the UE fails in decoding a coordination field.

Another object of the present invention is to provide a control signal resource allocation structure for providing flexibility and agnostic characteristics in a multi-carrier system.

A further object of the present invention is to provide a search zone configured to be compatible between environments having different carrier aggregation capabilities of UEs.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the above technical problems, the present invention provides various methods for reducing the blind decoding complexity of a UE in detecting a control channel in a multi-carrier broadband wireless access system.

In an aspect of the present invention, a method for detecting a control channel in a multi-carrier system includes receiving a first control signal including carrier information allocated to a terminal supporting a plurality of carriers, performing blind decoding using the first control signal to detect the control channel, and receiving a second control signal on the detected control channel. The terminal decodes only a specific carrier selected from a candidate carrier set based on the first control signal, without decoding all carriers allocated to the terminal.

The first control signal may include at least one of a number of scheduled CCs indication parameter, a PDCCH monitoring set indication, a scheduled CC indication, a bandwidth and transmission mode indication, a CCE aggregation level, the number of candidate PDCCHs, the indexes of the candidate PDCCHs, a DCI format indication, and CFI values for candidate carrier sets. The first control signal may be transmitted by RRC signaling or on a PDCCH.

The carrier information may include at least one of information indicating a carrier to which the control channel allocated to the terminal is allocated, information about candidate carriers for transmitting a data channel to the terminal, information indicating an area or a carrier in which the terminal is to perform the blind decoding, and information indicating an aggregation level of each of the plurality of carriers. The carrier information may be transmitted by RRC signaling or on a PDCCH.

The control channel is a Physical Downlink Control Channel (PDCCH). In addition, while the first control signal may be an RRC signal being a higher-layer control channel signal, it may be a first PDCCH signal transmitted on a PDCCH. If some elements of the first control signal are not transmitted as the first control signal, they may be transmitted as the second control signal.

The first control signal may be transmitted by higher-layer signaling such as UE-specific RRC signaling and the second control signal may be transmitted on a PDCCH.

If the decoding of the first control signal is failed, the terminal may enter fallback mode without performing the subsequent steps and may detect the control channel by performing blind decoding on all candidate carriers allocated to the terminal. When the terminal fails to receive the first control signal, the terminal may enter the fall back mode.

In another aspect of the present invention, a terminal for detecting a control channel in a multi-carrier system includes a radio Frequency (RF) module for transmitting and receiving a radio signal and a processor for detecting the control channel. The processor of the terminal is adapted to perform receiving a first control signal including carrier information allocated to the terminal supporting a plurality of carriers, performing blind decoding using the first control signal to detect the control channel, and receiving a second control signal on the detected control channel. The terminal decodes only a specific carrier selected from a candidate carrier set based on the first control signal, without decoding all carriers allocated to the terminal.

The first control signal may include at least one of a number of scheduled CCs indication parameter, a PDCCH monitoring set indication, a scheduled CC indication, a bandwidth and transmission mode indication, a CCE aggregation level, the number of candidate PDCCHs, the indexes of the candidate PDCCHs, a DCI format indication, and CFI values for candidate carrier sets.

The carrier information may include at least one of information indicating a carrier to which the control channel allocated to the terminal is allocated, information about candidate carriers for transmitting a data channel to the terminal, information indicating an area or a carrier in which the terminal is to perform the blind decoding, and information indicating an aggregation level of each of the plurality of carriers.

The control channel may be a Physical Downlink Control Channel (PDCCH). The first control signal may be a first PDCCH signal transmitted on a higher-layer channel or a PDCCH. The first control signal may be transmitted by RRC signaling.

The above embodiments are part of preferred embodiments of the present invention. Obviously, it is to be understood to those having ordinary knowledge in the art that various embodiments having the technical features of the present invention can be implemented on the detailed description of the present invention as set forth herein.

Advantageous Effects

According to the embodiments of the present invention, the blind decoding complexity of detecting a control channel can be reduced. In addition, the blind decoding complexity of a UE can be reduced by explicit or implicit signaling. In case of explicit signaling, even though the UE fails in decoding a coordination field, it can detect a control channel in a fallback mode. The UE can use a search zone configured to be compatible between systems in an environment where UEs have different carrier aggregation capabilities. Therefore, a PDCCH can be configured in a carrier aggregation environment, a control signal allocation region can be readily detected in the PDCCH, and the number of blind decodings can be reduced according to the embodiments of the present invention.

It will be appreciated by persons skilled in the art that that the effects that could be achieved with the present invention are not limited to what has been particularly described hereinabove and other advantages of the present invention will be more clearly understood from the following detailed description.

BEST MODE FOR CARRYING OUT THE INVENTION

Figure 1:
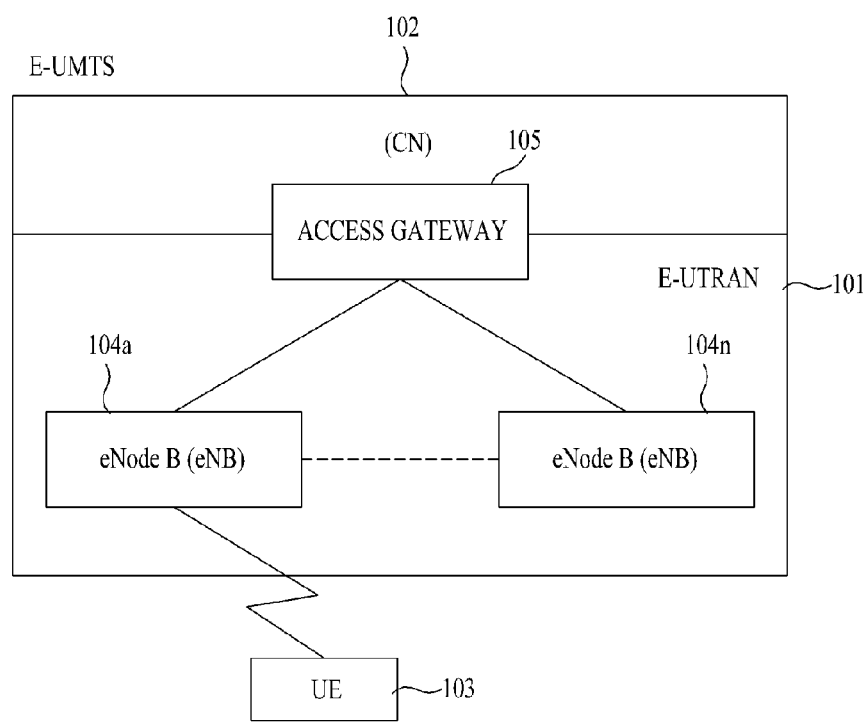
FIG. 1 is a schematic view illustrating the configuration of an E-UMTS network as an example of a mobile communication system.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description has been mainly made of a data transmission and reception relationship between a BS and a UE (User Equipment). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an ABS (Advanced Base Station), an access point, etc.

The term UE may be replaced with an MS (Mobile Station), an SS (Subscriber Station), an MSS (Mobile Subscriber Station), an AMS (Advanced Mobile Station), a mobile terminal, etc. Especially, it is made sure that the terms 'eNB' and 'eNode-B' are interchangeably used and the terms 'UE' and 'terminal' are interchangeably used in the embodiments of the present invention.

A transmitter is a fixed and/or mobile node that provides a data or voice service and a receiver is a fixed and/or mobile node that receives a data or voice service. Therefore, an MS may serve as a transmitter and a BS may serve as a receiver, on an uplink. Likewise, the MS may serve as a receiver and the BS may serve as a transmitter, on a downlink.

The embodiments of the present invention are supported by standard documents disclosed for at least one of wireless access systems including a 3GPP system, a 3GPP LTE system, a 3GPP LTE-A system, and IEEE 802.xx systems. In particular, the steps or parts, which are not described to clearly reveal the technical idea of the present invention, in the embodiments of the present invention may be supported by the above documents. All terms used in the embodiments of the present invention may be explained by the standard documents.

While the following detailed description is given under the assumption that a 3GPP LTE system and/or a 3GPP LTE-A (LTE Advanced) system is being used as mobile communication system, the description is applicable to any other mobile communication system except for specific features inherent to the 3GPP LTE and/or 3GPP LTE-A system.

In some instances, known structures and devices are omitted, or are shown in block diagram form focusing on important features of the structures and devices, so as not to obscure the concept of the present invention. The same reference numbers will be used throughout this specification to refer to the same or like parts.

In a mobile communication system, a UE may receive information from a BS on a downlink and transmit information to the BS on an uplink. The information that the UE transmits or receives includes data and various types of control information. There are many physical channels according to the types and usages of information that the UE transmits or receives.

In the embodiments of the present invention, a system using a single component carrier as a system band is referred to as a legacy system or narrowband system. In comparison, a system that has a plurality of component carriers as a system band and uses at least one of the component carriers as the system block of the legacy system is referred to as an evolved system or wideband system.

The component carrier used as the legacy system block is equal in size to the system block of the legacy system. While the sizes of the other component carriers are not limited otherwise, they may be determined based on the size of the system block of the legacy system, in terms of system simplification. For example, the 3GPP LTE (Release-8) system and the 3GPP LTE-A (Release-10) system are in the relationship between a legacy system and an evolved system. In this context, the LTE system may be a legacy system, and the LTE-A system may be an evolved system in the embodiments of the present invention.

<Communication Environment Applicable to Embodiments of the Present Invention>

A description will be given below of a communication environment that can be applied to the embodiments of the present invention.

Figure 2:
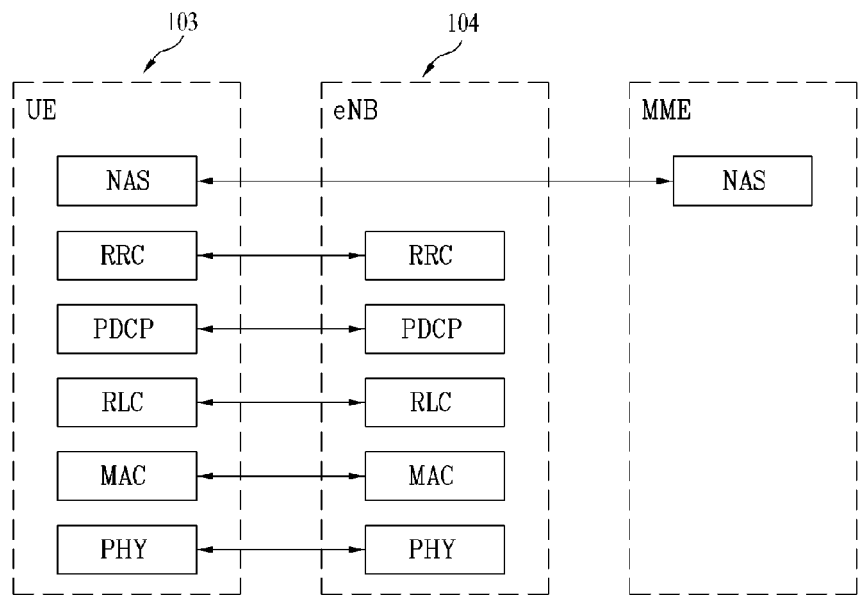
FIG. 2 illustrates control-plane and user-plane structures in a radio interface protocol architecture conforming to a 3GPP radio access network standard between a UE and an E-UTRAN.
Figure 2:
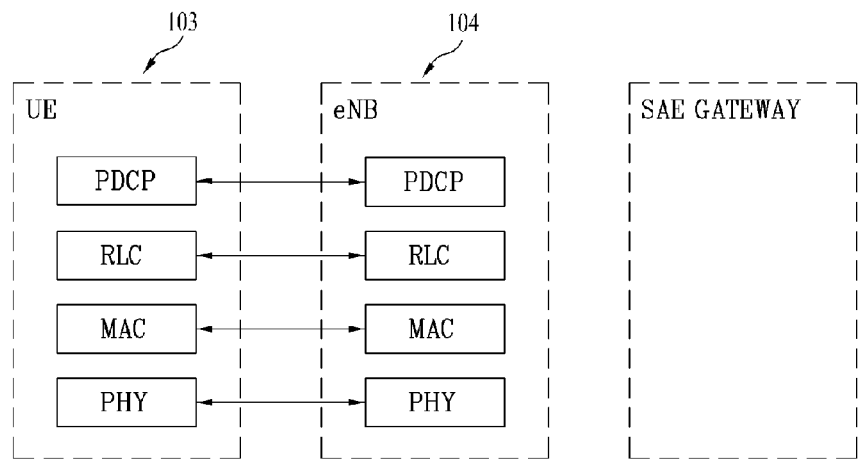

FIG. 2 illustrates control-plane and user-plane protocol stacks in a radio interface protocol architecture conforming to a 3GPP wireless access network standard between a UE and an E-UTRAN.

The control plane is a path in which the UE and the network transmit control messages to manage calls, and the user plane is a path in which data generated from an application layer, for example, voice data or Internet packet data is transmitted.

A PHY layer at L1 provides information transfer service to its higher layer through physical channels. The PHY layer is connected to its higher layer, a MAC layer through transport channels. The transport channels deliver data between the MAC layer and the PHY layer.

Meanwhile, data is transmitted on physical channels between the PHY layers of a transmitter and a receiver. The physical channels use time and frequency as radio resources. Specifically, the physical channels are modulated in OFDMA (Orthogonal Frequency Division Multiple Access) for downlink and in SC-FDMA (Single Carrier Frequency Division Multiple Access) or clustered SC-FDMA for uplink.

The MAC layer at L2 provides service to its higher layer, an RLC (Radio Link Control) layer through logical channels. The RLC layer at L2 supports reliable data transmission. The functions of the RLC layer may be implemented into function blocks of the MAC layer. A PDCP (Packet Data Convergence Protocol) layer at L2 performs header compression to reduce the amount of unnecessary control information to thereby efficiently transmit IP packets such as IPv4 or IPv6 packets via a radio interface having a narrow bandwidth.

An RRC (Radio Resource Control) layer at the lowest part of L3 is defined only on the control plane. The RRC layer controls logical channels, transport channels, and physical channels in relation to configuration, reconfiguration, and release of RBs (Radio Bearers). An RB refers to a service provided at L2, for data transmission between the UE and the network. For this purpose, the RRC layers of the UE and the network exchange RRC messages with each other. If an RRC connection has been established between the RRC layers of the UE and the network, the UE is in RRC connected mode. Otherwise, the UE is in RRC idle mode. A NAS (Non-Access Stratum) layer above the RRC layer performs functions such as session management, mobility management, etc.

Downlink transport channels that deliver data from the network to UEs include a BCH (Broadcast Channel) for carrying system information, a PCH (Paging Channel) for carrying a paging message, and an SCH (Shared Channel) for carrying user traffic or a control message. Traffic or control messages of a downlink multicast or broadcast service may be transmitted on a downlink SCH or on a separately defined downlink MCH (Multicast Channel).

Uplink transport channels that deliver data from UEs to the network include an RACH (Random Access Channel) for carrying an initial control message and an uplink SCH (Shared Channel) for carrying user traffic or a control message. Logical channels that are defined above transport channels and mapped to transport channels include a BCCH (Broadcast Control Channel), a PCCH (Paging Control Channel), a CCCH (Common Control Channel), an MCCH (Multicast Control Channel), and an MTCH (Multicast Traffic Channel).

Figure 3:
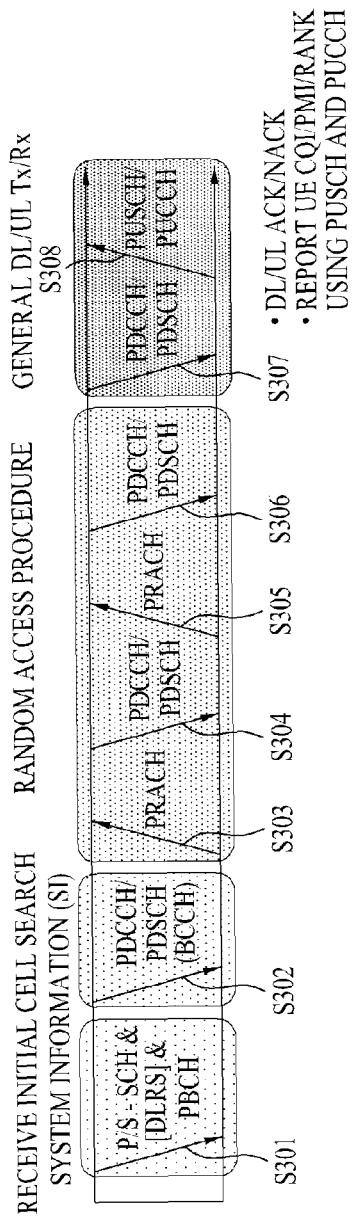
FIG. 3 illustrates physical channels and a typical method for transmitting signals on the physical channels in a 3GPP system.

FIG. 3 illustrates physical channels and a method for transmitting signals on the physical channels in the 3GPP system.

When a UE is powered on or enters a new cell, the UE performs initial cell search (S301). The initial cell search involves acquisition of synchronization to an eNB. Specifically, the UE synchronizes its timing to the eNB and acquires information such as a cell ID by receiving a P-SCH (Primary Synchronization Channel) and an S-SCH (Secondary Synchronization Channel) from the eNB. Then the UE may acquire information broadcast in the cell by receiving a PBCH (Physical Broadcast Channel) from the eNB. During the initial cell search, the UE may monitor a downlink channel state by receiving a DL RS (Downlink Reference Signal).

After the initial cell search, the UE may acquire more detailed system information by receiving a PDCCH (Physical Downlink Control Channel) and receiving a PDSCH (Physical Downlink Shared Channel) based on information of the PDCCH (S302).

If the UE initially accesses the eNB or has no radio resources for signal transmission, the UE may perform a random access procedure with the eNB (S303 to S306). In the random access procedure, the UE may transmit a predetermined sequence as a preamble on a PRACH (Physical Random Access Channel) (S303 and S305) and may receive a response message to the preamble on a PDCCH and a PDSCH associated with the PDCCH (S304 and S306). In case of a contention-based random RACH, the UE may additionally perform a contention resolution procedure.

After the above procedure, the UE may receive a PDCCH/PDSCH from the eNB (S307) and transmit a PUCCH (Physical Uplink Shared Channel)/PUSCH (Physical Uplink Control Channel) to the eNB (S308), in a general downlink and uplink signal transmission procedure.

Information that the UE transmits to the eNB on the uplink or receives from the eNB on the downlink includes a downlink/uplink ACK/NACK signal, a CQI (Channel Quality Indicator), a PMI (Precoding Matrix Index), an RI (Rank Indicator), etc. In the 3GPP LTE system, the UE may transmit information such as a CQI/PMI/RI, etc. on a PUSCH and/or a PUCCH.

Figure 4:
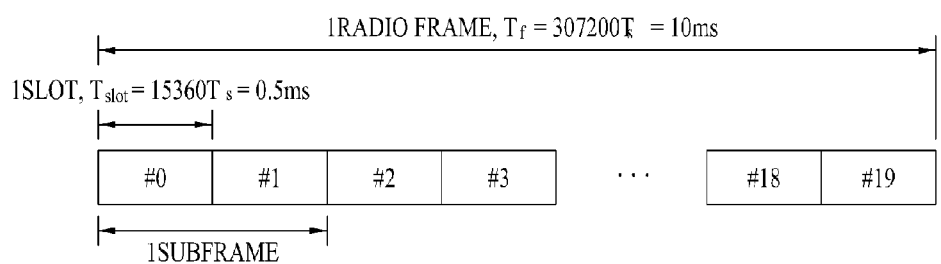
FIG. 4 illustrates an exemplary radio frame structure in an LTE system.

FIG. 4 illustrates a radio frame structure in the LTE system.

Referring to FIG. 4, a radio frame is 10 ms (307200*$T_S$) in duration. The radio subframe is divided into 10 equal-sized subframes. Each subframe is 1 ms long and further divided into two slots, each of 0.5 ms (15360*$T_S$) in duration. $T_S$ represents a sampling time and is given as $T_S=1/(15 \text{ kHz} \times 2048)=3.2552\times10^{-8}$ (about 33 ns). A slot includes a plurality of OFDM symbols in time by a plurality of RBs (Resource Blocks) in frequency. One RB has 12 subcarriers by 7 (6) OFDM symbols in the LTE system. A unit time in which data is transmitted, known as TTI (Transmission Time Interval) may be defined as one or more subframes. This radio frame structure is purely exemplary and thus the number of subframes in a radio frame, the number of slots in a subframe, or the number of OFDM symbols in a slot may vary depending on a communication environment or user requirements.

Figure 5:
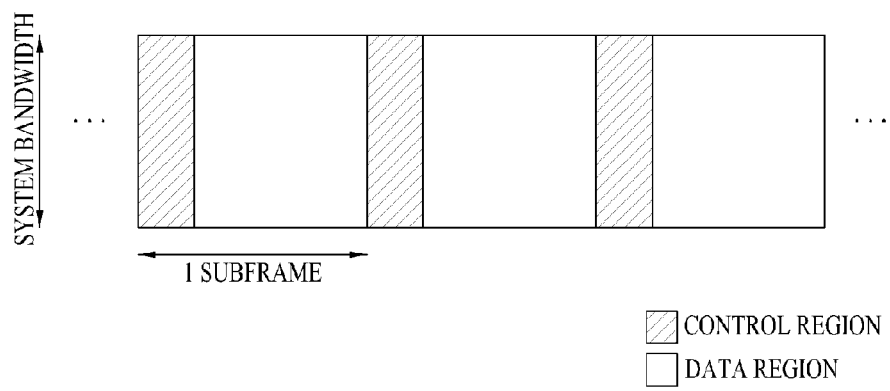
FIG. 5 illustrates the functional structure of a downlink radio frame.

FIG. 5 illustrates the functional structure of a downlink radio frame.

Referring to FIG. 5, a downlink radio frame may include 10 equal-sized subframes. In the 3GPP LTE system, a subframe is defined as the basic time unit of packet scheduling across a total downlink frequency. Each subframe is divided into a control region for transmitting scheduling information and other control channels and a data region for transmitting downlink data.

The control region includes one to three OFDM symbols, starting from the first OFDM symbol of the subframe. The size of the control region may be determined independently for each subframe. The control region carries L1/L2 (Layer 1/Layer 2) control signals, whereas the data region carries downlink traffic.

Figure 6:
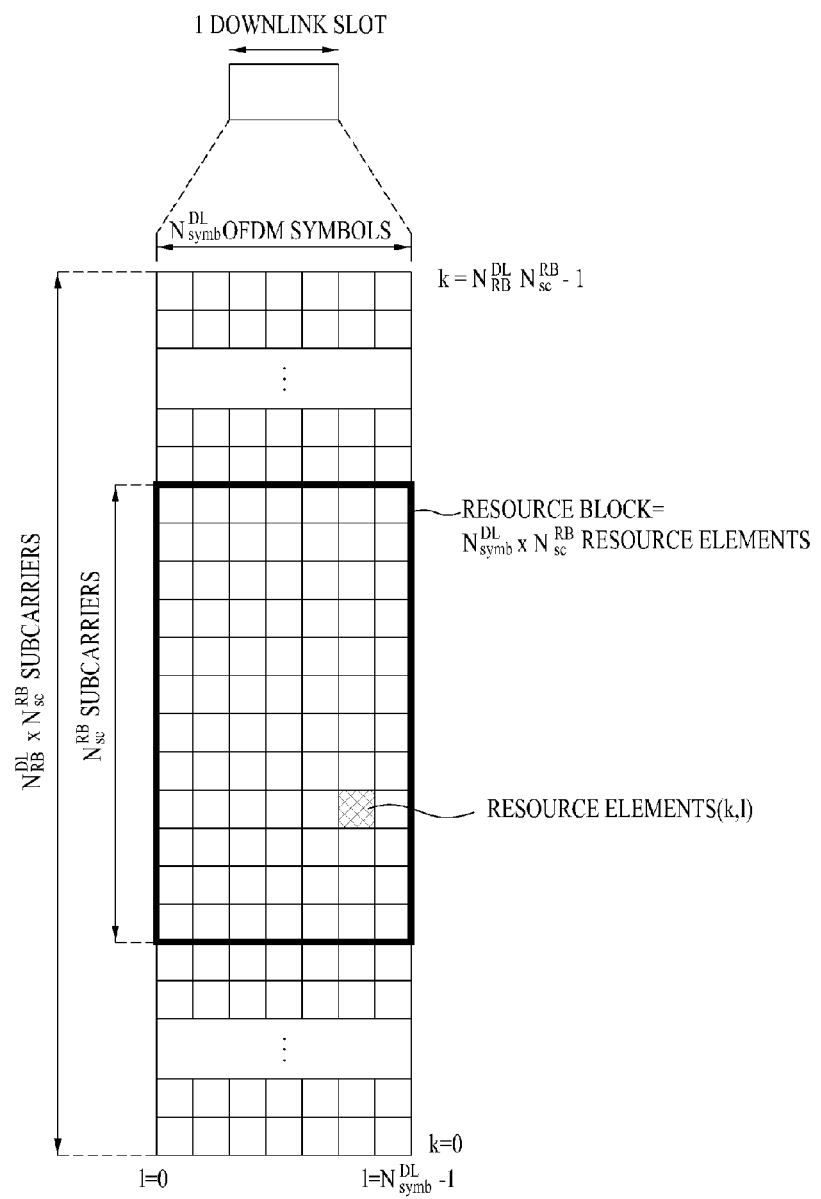
FIG. 6 illustrates the resource grid of a downlink slot.

FIG. 6 illustrates the resource grid of a downlink slot.

Referring to FIG. 6, the downlink slot includes $N^{DL}_{symb}$ OFDM symbols in time by $N^{DL}_{RB}$ RBs in frequency. Because each RB includes $N^{RB}_{sc}$ subcarriers, the downlink slot includes $N^{DL}_{RB} \times N^{RB}_{sc}$ subcarriers in total.

In FIG. 6, a downlink slot includes 7 OFDM symbols and an RB includes 12 subcarriers, which does not limit the scope and spirit of the present invention. For example, the number of OFDM symbols in a downlink slot depends on the length of a CP (Cyclic Prefix).

Each element in the resource grid is referred to as an RE (Resource Element). An RE is indicated by one OFDM symbol index and one subcarrier index. One RB includes $N^{DL}_{symb} \times N^{DL}_{sc}$ REs. The number of RBs included in a downlink slot, $N^{DL}_{RB}$ depends on a downlink transmission bandwidth set by a cell.

Figure 7:
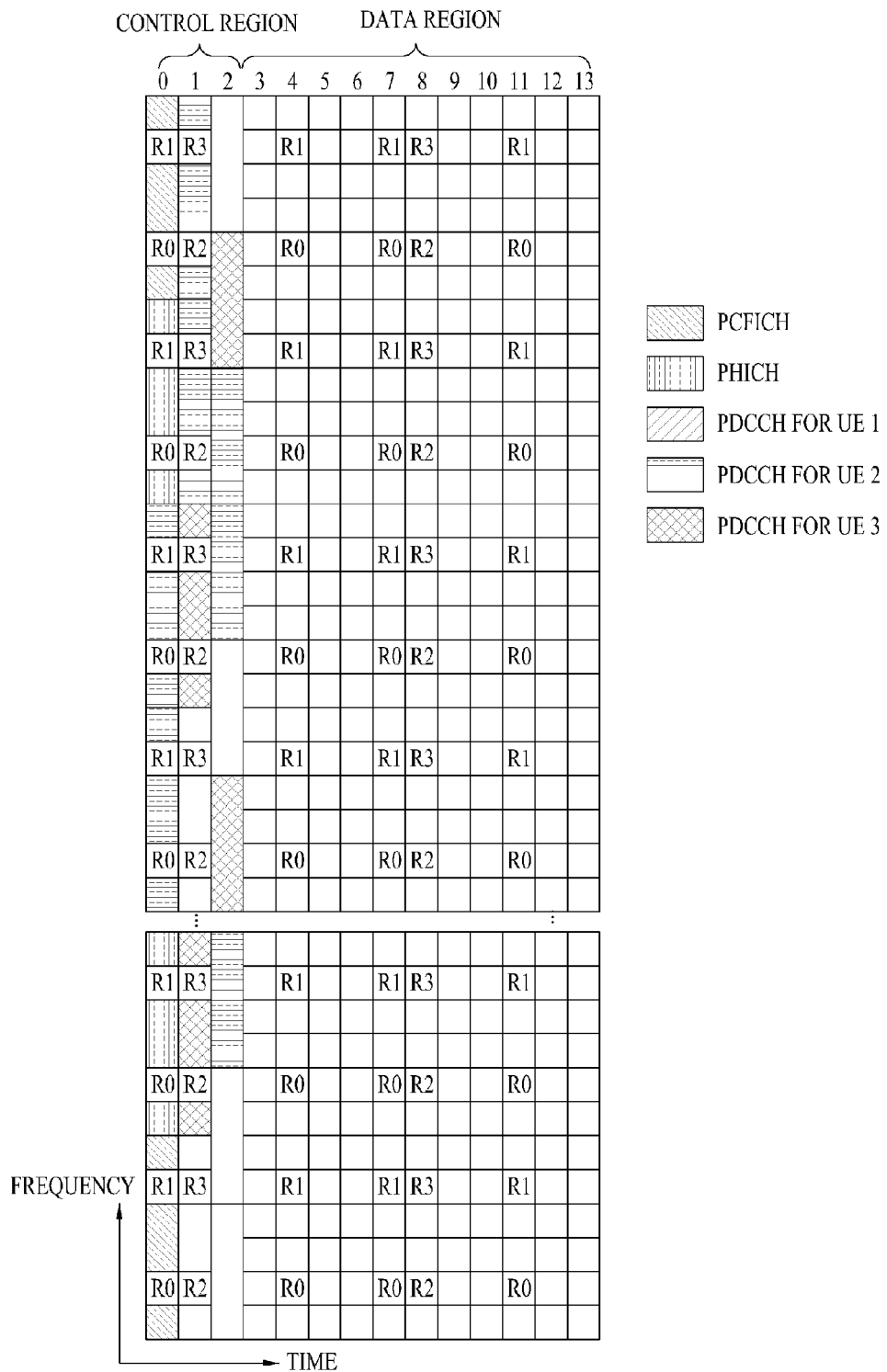
FIG. 7 illustrates an example of control channels included in a control region and a data region in a subframe.

FIG. 7 illustrates an example of control channels included in a control region and a data region in a subframe.

Referring to FIG. 7, the subframe includes 14 OFDM symbols. The first one to three OFDM symbols (0 to 2) are used for the control region and the remaining 13 to 11 OFDM symbols (3 to 13) are used for the data region.

In FIG. 7, R1 to R4 represents RSs (Reference Signals) for antenna 0 to antenna 3. The RSs are in a predetermined pattern in the subframe, irrespective of the control region and the data region. Control channels are allocated to resources unused for RSs in the control region and traffic channels are also allocated to resources unused for RSs in the data region. The control channels allocated to the control region include a PCFICH (Physical Control Format Indicator Channel), a PHICH (Physical Hybrid-ARQ Indicator Channel, and a PDCCH (Physical Downlink Control Channel).

The PCFICH indicates the number of OFDM symbols used for the PDCCH in each subframe to UEs. The PCFICH resides in the first OFDM symbol, preceding the PHICH and the PDCCH. The PCFICH includes four Resource Element Groups (REGs), each REG being distributed across the control region according to a cell ID. One REG includes four RE2. The PCFICH specifies a value of 1 to 3, modulated in QPSK (Quadrature Phase Shift Keying).

The PHICH is a physical HARQ indicator channel for delivering an HARQ ACK/NACK for an uplink transmission. The PHICH includes three REGs and is scrambled cell-specifically. An ACK/NACK is indicated in one bit, spread with an SF (Spreading Factor) of 2 or 4, and repeated three times. A plurality of PHICHs may be mapped to the same resources. The PHICH is modulated in BPSK (Binary Phase Shift Keying).

The PDCCH is a physical downlink control channel allocated to the first n OFDM symbols of a subframe. Here, n is an integer equal to or larger than 1, indicated by the PCFICH. The PDCCH may deliver a downlink grant (i.e. resource assignment and a transmission format) of a PDSCH, an uplink grant (i.e. resource allocation information) of a PUSCH, a set of transmit power control commands for individual UEs within a UE group, and VoIP (Voice over Internet Protocol) activation information. In addition, the PDCCH may deliver to each UE or UE group information related to resource allocation for transport channels, a PCH (Paging Channel) and a DL-SCH (Downlink-shared channel), and HARQ information.

The PDCCH includes an aggregate of one or more consecutive CCEs (Control CHannel Elements). The PDCCH may be transmitted in the control region after subblock interleaving. A CCE is a logical allocation unit for providing a coding rate to the PDCCH according to the state of a radio channel. The CCE corresponds to a plurality of REGs (Resource Element Groups). The format and number of available CCEs of the PDCCH may be determined according to the relationship between the number of CCEs and a coding rate provided by the CCEs.

Control information carried on the PDCCH is called DCI (Downlink Control Information).

TABLE 1

| DCI Format | Description |
| --- | --- |
| DCI format 0 | Used for scheduling of PUSCH |
| DCI format 1 | Used for scheduling of one PDSCH codeword |
| DCI format 1A | Used for compact scheduling of one PDSCH codeword and random access procedure initiated by a PDCCH order |
| DCI format 1B | Used for compact scheduling of one PDSCH codeword with precoding information |
| DCI format 1C | Used for very compact scheduling of one PDSCH codeword |
| DCI format 1D | Used for compact scheduling of one PDSCH codeword with precoding and power offset information |
| DCI format 2 | Used for scheduling of PDSCH to UEs configured in closed-loop spatial multiplexing mode |
| DCI format 2A | Used for scheduling of PDSCH to UEs configured in open-loop spatial multiplexing mode |
| DCI format 3 | Used for transmission of TPC commands for PUCCH and PUSCH with 2-bit power adjustments |
| DCI format 3A | Used for transmission of TPC commands for PUCCH and PUSCH with 1-bit power adjustments |

DCI format 0 conveys uplink resource allocation information, DCI format 1 to DCI format 2 are used to indicate downlink resource allocation information, and DCI format 3 and DCI format 3A indicate uplink TPC (Transmit Power Control) commands for UE groups.

An eNB determines control information, that is, a DCI format according to the transmission mode of a UE and adds a CRC (Cyclic Redundancy Check) to the control information. The CRC is masked by a unique ID (e.g. an RNTI (Radio Network Temporary Identifier)) according to the owner or purpose of the PDCCH. If the PDCCH is for a specific UE, the CRC may be masked by a unique ID of the UE, for example, a C-RNTI (Cell-RNTI). If the PDCCH is for a paging message, the CRC may be masked by a paging indicating ID, for example, P-RNTI (Paging-RNTI). If the PDCCH is for system information, the CRC may be masked by a system information ID, SI-RNTI (System Information-RNTI). To indicate a random access response for a random access preamble received from a UE, the CRC may be masked by an RA-RNTI (Random Access-RNTI).

That is, a PDCCH for which a C-RNTI is used delivers control information to a specific UE corresponding to the C-RNTI. A PDCCH for which another type of RNTI is used delivers common control information to all or a plurality of UEs within a cell.

However, the PCH (Paging channel) and the DL-SCH (Downlink-shared channel) are transmitted on the PDSCH. Therefore, an eNB and a UE transmit and receive data generally on a PDSCH except for specific control information or specific service data.

Information about the destination (one or more UEs) of data of a PDSCH and information about how the UEs should receive and decode the PDSCH data is delivered on a PDCCH.

For example, if the CRC of a particular PDCCH is masked by RNTI (Radio Network Temporary Identity) "A" and information about data transmitted in radio resources "B" (e.g. a frequency position) with transmission format "C" (e.g. a transport block size, a modulation scheme, coding information, etc.) is transmitted in a particular subframe, one or more UEs within the cell monitor the PDCCH using their RNTI information. If one or more UEs have RNTI "A", the UEs receive the PDCCH and then receive a PDSCH indicated by "B" and "C" based on the received information of the PDCCH.

Now, a description will be given of BD (Blind Decoding) used in the embodiments of the present invention. An eNB may transmit a plurality of PDCCHs in one subframe and a UE may monitor a plurality of PDCCHs in each subframe.

Monitoring means that the UE attempts to decode each PDCCH according to a received PDCCH format. The eNB does not provide the UE with information indicating the position of a PDCCH destined for the UE in the control region of a subframe. The UE searches for its PDCCH by monitoring a set of PDCCH candidates in the subframe. This operation is called BD. For example, if the UE de-masks the CRC of a PDCCH by its C-RNTI and does not detect a CRC error in the de-masked CRC, this implies that the UE has detected a PDCCH having its DCI.

To receive downlink data, the UE first receives downlink resource assignment on a PDCCH. When detecting the PDCCH successfully by BD, the UE reads DCI on the PDCCH. The UE receives downlink data on a PDSCH using the downlink resource assignment of the DCI. In addition, to transmit uplink data, the UE first receives uplink resource assignment on a PDCCH. If the UE succeeds in detecting the PDCCH by BD, it reads DCI on the PDCCH. Then the UE transmits uplink data on a PUSCH using the uplink resource assignment of the DCI.

Multiple carriers that can be applied to the embodiments of the present invention will be described below.

A cell managed by an eNB is set to one of bandwidths 1.25, 2.5, 5, 10, 15, and 20 Mhz and provides a downlink or uplink transmission service to a plurality of UEs in the set bandwidth. Different cells may be set to different bandwidths.

Although the 3GPP LTE system supports different downlink and uplink bandwidths, the support is based on the premise of one carrier. This means that 3GPP LTE supports the same or different downlink and uplink bandwidths only in a situation where one carrier is defined for each of the downlink and the uplink. For example, even though the 3GPP LTE system supports up to 20 MHz and has different downlink and uplink bandwidths, it supports only one carrier for each of the downlink and the uplink.

In contrast, the 3GPP LTE-A system supports a plurality of carriers through spectrum aggregation (also called bandwidth aggregation or carrier aggregation). The spectrum aggregation was introduced to support increased throughput, prevent cost increase caused by the introduction of wideband RF devices, and ensure backward compatibility with the legacy system. For example, a bandwidth of up to 100 Mhz can be supported by allocating five carriers with a granularity of a 20-MHz carrier unit.

Spectrum aggregation may be classified into contiguous spectrum aggregation in which contiguous carriers in the frequency domain are aggregated and non-contiguous spectrum aggregation in which non-contiguous carriers in the frequency domain are aggregated. Different numbers of carriers may be aggregated for the downlink and the uplink. Aggregation of the same number of carriers for the downlink and the uplink is referred to as symmetric aggregation, whereas aggregation of different numbers of carriers for the downlink and the uplink is referred to as asymmetric aggregation.

The sizes (i.e. bandwidths) of multiple carriers may be different. For example, if five carriers are combined into a 70-MHz band, the 70-MHz band may be composed of a 5-MHz carrier (carrier #0)+a 20-MHz carrier (carrier #1)+a 20-MHz carrier (carrier #2)+a 20-MHz carrier (carrier #3)+a 5-MHz carrier (carrier #4).

Hereinafter, a multi-carrier system refers to a system supporting multiple carriers through spectrum aggregation. The multi-carrier system may adopt contiguous spectrum aggregation and/or non-contiguous spectrum aggregation, which may be symmetric or asymmetric aggregation.

In Carrier Aggregation (CA), a plurality of Component Carriers (CCs) are combined into a single wide logical frequency band, to achieve a wider frequency band. The bandwidth of each CC may be defined based on the bandwidth of the system block of the LTE system. Each CC is transmitted using a CC. In the specification, the term CC may be used to signify a CC for CA or the central carrier of a CC. Thus these terms are interchangeably used.

A UE may transmit or receive one or more CCs according to its capability. That is, an LTE-A UE may transmit or receive one or more carriers simultaneously, while a legacy UE (i.e. an LTE UE) may transmit or receive only one carrier.

FIGS. 8(a) and 8(b) illustrate an exemplary mapping relationship between a MAC layer and a PHY layer in an eNB and a UE which support multiple carriers.

Figure 8:
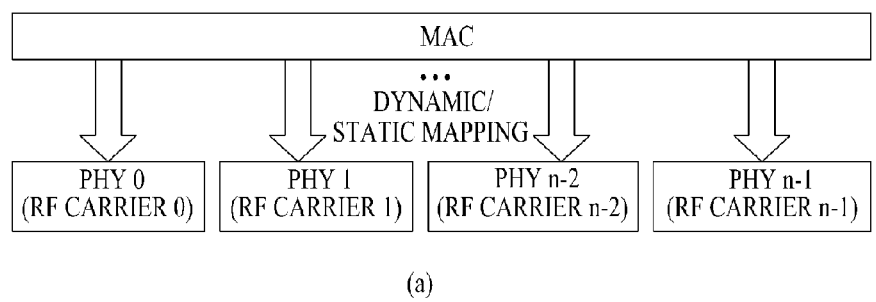
FIGS. 8(a) and 8(b) illustrate an exemplary mapping relationship between a MAC layer and a PHY layer in an eNB and a UE supporting multiple carriers.
Figure 8:
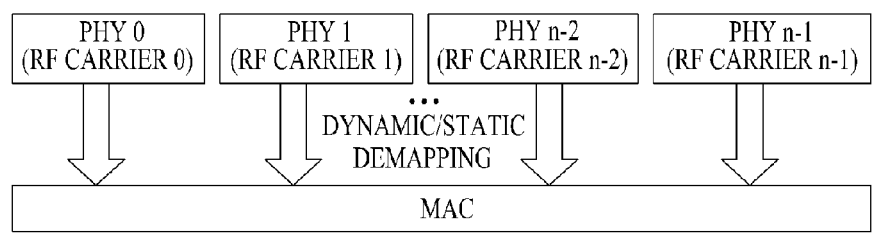

In the illustrated case of FIG. 8, one MAC layer manages a plurality of carriers. A transmitter (e.g. an eNB) and a receiver (e.g. a UE) are illustrated respectively in FIGS. 8(a) and 8(b). To effectively transmit and receive a plurality of carriers, both the transmitter and the receiver preferably support the plurality of carriers.

Figure 9:
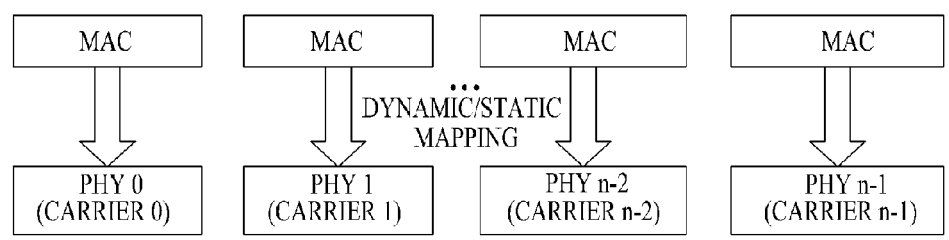
FIGS. 9(a) and 9(b) illustrate an exemplary method for managing a plurality of carriers in a plurality of MAC layers.
Figure 9:
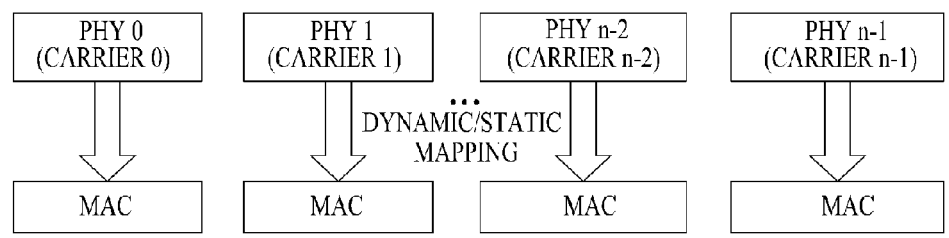

FIGS. 9(a) and 9(b) illustrate an exemplary method for managing a plurality of carriers in a plurality of MAC layers.

FIG. 9(a) illustrates a one-to-one mapping relationship between MAC layers and PHY layers, when a transmitter (e.g. an eNB) supports a plurality of carriers, and FIG. 9(b) illustrates a one-to-one mapping relationship between MAC layers and PHY layers, when a receiver (e.g. a UE) supports a plurality of carriers. One PHY layer may use one carrier.

FIGS. 10(a) and 10(b) illustrate an exemplary method for managing one or more carriers in a single MAC layer.

Figure 10:
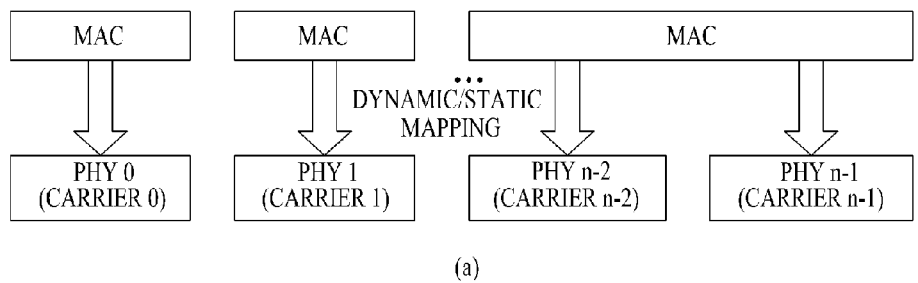
FIGS. 10(a) and 10(b) illustrate an exemplary method for managing one or more carriers in a single MAC layer.
Figure 10:
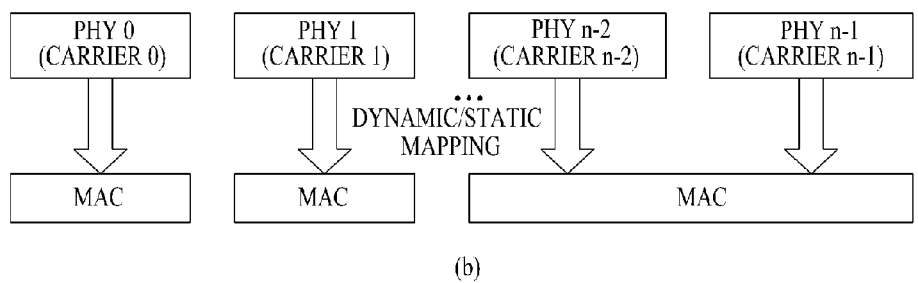

In FIG. 10, while one MAC layer may be mapped independently to one PHY layer for each of specific carriers (e.g. carrier 0 and carrier 1), one MAC layer may be mapped to PHY layers for other specific carriers (e.g. carrier n−1 and carrier n−1). If this hybrid mapping scheme is used, some carriers for which one MAC layer is mapped to a plurality of PHY layers may be multiplexed in the method of FIG. 6.

Referring to FIG. 10, a one-to-one or one-to-m (m>1) mapping relationship is established between MAC layers and PHY layers, when a transmitter (e.g. an eNB) supports a plurality of carriers, in FIG. 10(a). A one-to-one or one-to-m mapping relationship is established between MAC layers and PHY layers, when a receiver (e.g. a UE) supports a plurality of carriers, in FIG. 10(b).

In a multi-carrier system, different UEs may use different carriers according to the capabilities of an eNB and the UEs. Notably, the carrier band support capability of the eNB may be constant. The eNB may negotiate support or non-support of carriers with a UE during call setup according to the capability of the eNB.

Three types of carriers are available in the LTE-A system, such as backward compatible carrier, non-backward compatible carrier, and extension carrier.

The backward compatible carrier is accessible to LTE UEs. The backward compatible carrier may be used as a part of CA or a single carrier. In FDD, backward compatible carriers are paired for the downlink and the uplink.

The non-backward compatible carrier is accessible only to LTE-A UEs. The non-backward compatible carrier may be used as a single carrier or as a part of CA.

The extension carrier is not available as a single carrier. Rather, the extension carrier is used only as a CC of a carrier set including at least one backward compatible carrier or non-backward compatible carrier.

Hereinbelow, a description will be given of a relationship between cell-specific linkage and UE-specific linkage as one of concepts used in the present invention.

In CA, one or more carriers are used for cell-specific linkage or UE-specific linkage. The term "cell-specific linkage" refers to CA from the perspective of a cell or an eNB and thus may be replaced with the term "cell-specific". If a cell means one backward or non-backward compatible carrier, the term "cell-specific" may be used to signify one or more carriers including one carrier represented by a cell or resources managed by an eNB.

Cell-specific DL/UL linkage may be a form of CA configured by an eNB or a cell. In the cell-specific DL/UL linkage, downlink and uplink linkage may be determined according to default Tx-Rx separation defined in the legacy (LTE) system and/or the LTE-A system, in case of FDD. For details of the default Tx-Rx separation of the legacy system, refer to sections 5.7.3 and 5.7.4 of 3GPP TS36.101.

UE-specific DL/UL linkage refers to configuring a CA type for use in a specific UE or UE group according to an arbitrary method (e.g. UE capabilities, negotiation, signaling, and/or broadcasting, etc.) between the UE and an eNB. For example, UE-specific DL/UL linkage defined in LTE-A may include a UE DL CC set, a UE UL CC set, and a PDCCH monitoring set.

A UE DL CC set configured by dedicated signaling to a UE may be scheduled for reception of a PDSCH on the downlink. A UE UL CC set may be scheduled for the UE to transmit a PUSCH on the uplink. In addition to the UE DL/UL CC set, a PDCCH monitoring set may be configured to be a subset of the UE DL CC set, to have the same size of the UE DL CC set, to include a part of the UE DL CC set, or to include one or more CCs that do not belong to the UE DL CC set.

Figure 11:
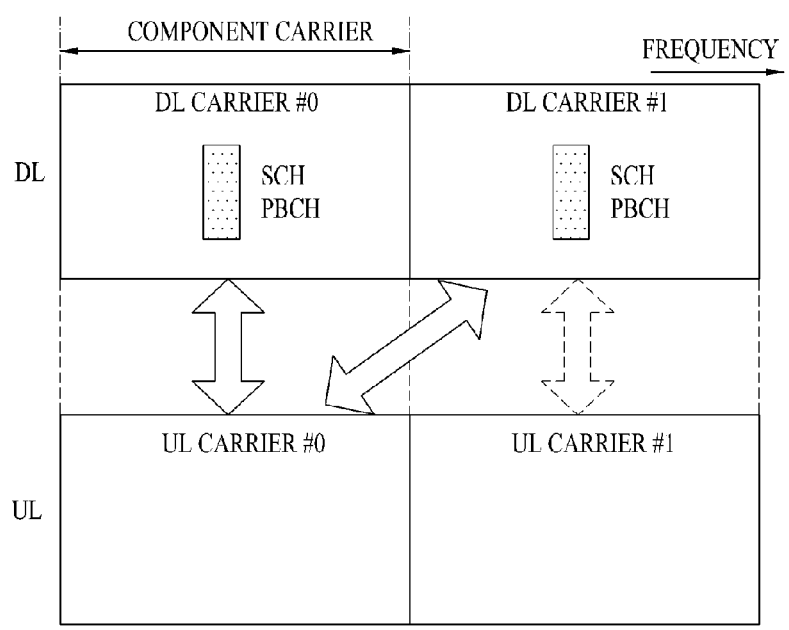
FIG. 11 illustrates an example of UE-specific CA (Carrier Aggregation).

FIG. 11 illustrates an example of UE-specific CA.

In the illustrated case of FIG. 11, the CA configuration of each cell is symmetrical. However, if a UE with an asymmetric CA capability is to be supported in the cell, DL/UL linkage information transmitted in system information (e.g. SI-2) of the cell may not be valid for the UE. To support all carrier configurations of cells and UEs irrespective of symmetric or asymmetric, the eNB preferably signals UE-specific CA information to each UE.

Cross carrier scheduling as one of the concepts applicable to the embodiments of the present invention will be described below.

Without cross carrier scheduling, PDSCH resources are allocated to a CC through a PDCCH of the same CC, or PUSCH resources are allocated to a linked single UL CC. In this case, a carrier indicator field is not necessary. That is, the PDCCH structure (i.e. the same coding and the same CCE-based resource mapping) and DCI formats of the LTE system may still be used. In addition, the DCI formats and PDCCH transmission mechanism of the LTE system are adopted. Therefore, an eNB and a UE operate in the same manner as in the LTE system (the legacy system) in relation to PDSCH transmission, UL ACK/NACK transmission, PUSCH transmission, and PHICH transmission.

Cross carrier scheduling is a scheme of allocating a PDSCH or PDSCH resources to one of a plurality of CCs using a carrier indicator field of a PDCCH transmitted on a CC. The carrier indicator field is transmitted in a DCI format. The PDCCH structure of the LTE system may also be reused. If a PDCCH (a DL grant) and a PDSCH are transmitted on different DL CCs or a PUSCH associated with a PDCCH (a UL grant) of a DL CC is transmitted on a UL CC other than a UL CC linked to the DL CC of the UL grant, cross carrier scheduling is allowed. In this case, a carrier indicator needs to be transmitted on the PDCCH to indicate a DL/UL CC carrying the PDSCH/PUSCH indicated by the PDCCH. In addition, different PDSCH, UL A/N, PUSCH, and PHICH transmission methods from those of the legacy (LTE) system are required according to cross scheduling.

It is preferable to restrict the number of BDs in the above two cross carrier scheduling schemes. The presence or absence of the carrier indicator field may be semi-static. In addition, it is determined UE-specifically, UE group-specifically, or cell-specifically whether to allow cross carrier scheduling. The eNB and the UE may reduce signaling overhead by semi-statically toggling a cross carrier scheduling operation. Accordingly, the carrier indicator field may be enabled/disabled semi-statically according to permission/non-permission of cross scheduling, that is, activation/de-activation of cross scheduling.

If cross carrier scheduling is de-activated, this implies that a PDCCH monitoring set is always identical to a UE DL CC set. In this case, there is no indication such as separate signaling of the PDCCH monitoring set. On the other hand, if cross carrier scheduling is activated, the PDCCH monitoring set should be defined within the UE DL CC set. Thus, it is necessary to indicate the PDCCH monitoring set by additional dedicated signaling.

Embodiment 1

Figure 12:
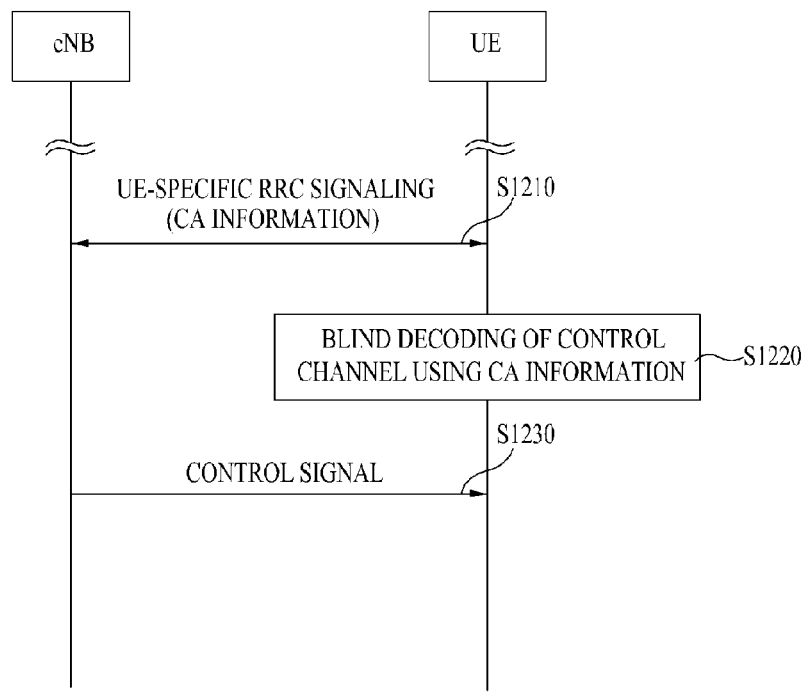
FIG. 12 is a signal diagram illustrating a method for transmitting UE-specific CA information by UE-specific signaling according to an embodiment of the present invention.

FIG. 12 is a signal diagram illustrating a method for transmitting per-UE CA information by UE-specific signaling according to an embodiment of the present invention.

In the LTE-A system supporting CA, an eNB and each UE may have prior knowledge of carriers accessible to the UE. Within a cell, legacy UEs (i.e. LTE UEs) that can access only a single carrier or a predefined number of carriers may co-exist with LTE-A UEs that can access a plurality of carriers according to their capabilities or carriers fewer than their capabilities.

The eNB may transmit to an LTE-A UE per-UE CA information including information about (candidate) carriers allocated to the LTE-A UE by dedicated signaling such as UE-specific RRC signaling (S1210).

The CA information may contain information about a UE DL CC set being a candidate carrier set for receiving a PDSCH at the UE and information about a UE UL CC set being a candidate carrier set for transmitting a PUSCH by the UE.

Such CA information may be defined, taking into account the capability of the UE, the traffic load of a cell, the coverage of each carrier, intra-network interference, and interference coordination between heterogeneous networks.

In the embodiments of the present invention, BD complexity may be reduced by defining a PDCCH monitoring set along with the afore-described carrier sets. That is, the CA information may further contain information about a PDCCH monitoring set.

The PDCCH monitoring set represents one or more CCs on which the UE should monitor PDCCHs. The size of the PDCCH monitoring set may be less than or equal to that of the UE DL CC set. Preferably, the PDCCH monitoring set is a subset of the UE DL CC set.

Thus, the UE may detect a control channel by BD of control channels (e.g. PDCCHs) based on the CA information received in step S1210 (S1220).

Then, the UE may receive and decode a control signal on the detected control channel (S1230).

As the eNB transmits information about candidate carriers to be decoded to a UE by dedicated signaling in this manner, the UE searches for a control channel only on the candidate carriers (e.g. a UE DL/UL CC set or a PDCCH monitoring set) without BD of all receivable carriers according to its capability and thus receives a control signal on the detected control channel. Therefore, the complexity of BD can be reduced.

Figure 13:
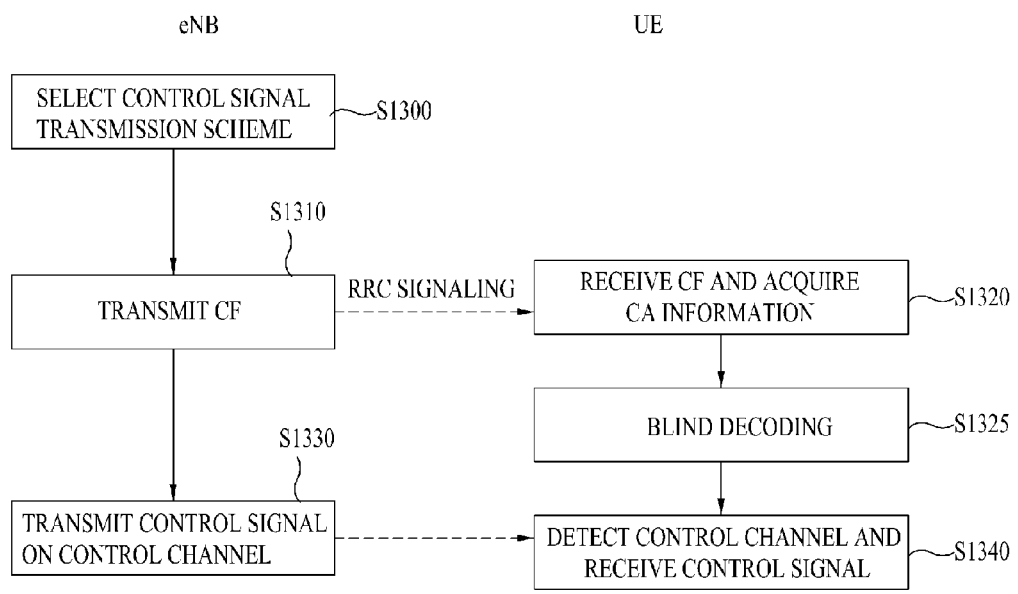
FIG. 13 is a signal diagram illustrating a method for transmitting UE-specific CA information using a Coordination Field (CA) according to a control signal transmission method according to an embodiment of the present invention.

FIG. 13 is a signal diagram illustrating a method for transmitting per-UE CA information in a Coordination Field (CA) according to a control signal transmission scheme according to an embodiment of the present invention.

Even in a situation where UEs having different capabilities (e.g. LTE UEs and LTE-A UEs) are co-located, the new LTE-A system should be able to operate without affecting existing LTE UEs (legacy UEs).

The biggest issue in this situation is that problems may be generated according to control channel operation schemes. For instance, there are downlink control channels such as the PCFICH, the PHICH, and the PDCCH in the LTE-A system. Since the LTE-A system supports the legacy system, if the LTE-A system supports CA, it should fulfill different requirements, for example, different transmission formats or aggregation levels, for LTE UEs and LTE-A UEs. Moreover, different resources may be used according to transmission formats or aggregation levels. However, there is no specified method for transmitting resource allocation information on one or more carriers. To avert this problem, the eNB may transmit per-UE CA information to a UE according to a control signal transmission scheme.

The eNB may encode control signals prior to transmission to UEs. For the eNB to transmit control signals, separate coding method 1, separate coding method 2, joint coding method 1, and joint coding method 2 are available.

In separate coding method 1, a control channel associated with a data channel of a carrier is transmitted as an independent PDCCH on the same carrier through separate coding, as done in a single-carrier system such as the legacy LTE system. That is, cross carrier scheduling is not permitted in separate coding method 1.

According to separate coding method 2, DCI formats are separately encoded to PDCCHs, as in the legacy LTE system. The difference from separate coding method 1 is that a control channel may be transmitted on a CC irrespective of a CC carrying a data channel signal. That is, separate coding method 2 permits cross carrier scheduling.

In joint coding method 1, when data channels are transmitted on a plurality of carriers in a subframe, PDCCHs associated with the PDSCHs are jointly encoded and transmitted on a specific one carrier. The specific carrier may be a primary carrier. In addition, the specific carrier may be determined UE-specifically.

According to joint coding method 2, when data channel signals are transmitted on a plurality of carriers in a subframe, PDCCHs associated with the PDSCHs are jointly encoded and transmitted across a total bandwidth. The total bandwidth may be determined UE-specifically.

In the embodiments of the present invention, a UE may perform BD in a different manner according to a control signal transmission scheme.

For example, the UE may detect a control channel allocated to it by BD of all scheduled CCs or all candidate CCs (e.g. a UE DL CC set) in separate coding method 1. In separate coding method 2, the UE may perform BD only on a PDCCH monitoring set. Since a control channel is transmitted on a specific CC in joint coding method 1, the UE does not need perform BD on all CCs. However, without information about the number of scheduled CCs or information about a DCI format transmitted on a jointly coded PDCCH, the UE preferably performs BD on possible subcarrier combinations.

In the LTE system, a UE does not know physical resources carrying a control channel signal allocated to the UE, in a subframe. That is, if the UE is not aware of the position of the physical resources, this means that the UE does not know a CCE carrying the control signal in a logical CCE sequence carrying one PDCCH. Moreover, because the UE does not know a subframe carrying its control channel signal, it can receive a control channel by BD, that is, by decoding control channels with respect to reference DCI formats according to all CCE aggregation levels and transmission modes in every subframe.

If independent scheduling is possible for every carrier in the LTE-A system supporting multiple carriers, each UE may not need to perform BD on all carriers. Due to independent scheduling for each carrier, data for every UE does not need to be transmitted on all carriers supported by the LTE-A system.

Accordingly, when independent scheduling is possible on a carrier basis, the eNB may transmit a CF containing CA information and/or information about a control signal transmission scheme (i.e. a control signal coding scheme) to a UE. That is, the UE can reduce the complexity of BD using parameters and/or information included in the CF and can receive its control channel effectively.

For instance, the eNB may transmit information about a PDCCH monitoring set (along with information about a UE DL/UL CC set) in a CF to a UE so that the UE can perform BD only on the PDCCH monitoring set.

In case of separate coding, the eNB may transmit information about a PDCCH monitoring set from among the total DL CCs of the cell in a CF to a UE. Thus, the UE may perform BD only on the scheduled CCs. In case of joint coding, the eNB may enable a UE to perform BD on as much as a control channel length in actual scheduled CCs.

Now a description will be given of parameters and/or information included in a CF, when PDCCHs are separately encoded to transmit control signals in FIG. 13.

In case of separate coding, if a UE does not know carriers carrying a control channel and a data channel, the UE attempts to detect its control channel by BD of all carriers supported by a multi-carrier system. As a consequence, the UE may suffer from excessive BD complexity.

In this context, the LTE-A system supporting multiple carriers may transmit a CF to an LTE-A UE so that the LTE-A UE can acquire in advance information about a carrier carrying a control channel signal or data channel signal allocated to the LTE-A UE (e.g. information about a UE DL/UL CC set or a PDCCH monitoring set), an area or carriers on which the LTE-A UE is supposed to perform BD, and/or the CCE aggregation level of each carrier. Thus the UE can receive data effectively, compared to the legacy LTE system. The BD area of the UE may be specified by the CCE aggregation level of a carrier, a starting CCE index, and/or the number of candidate PDCCHs.

In the case where a control signal is encoded in a separate coding scheme, the CF contains the following parameters and/or information.

The CF may include at least one of a number of scheduled CC indication, a PDCCH monitoring set indication, a scheduled CC indication, a BW and/or transmission mode indication, a CCE aggregation level, the number of candidate PDCCHs, candidate PDCCH indexes, a DCI format indication, and/or CFI values for candidate carrier sets.

The number of scheduled CC indication indicates the number of CCs scheduled in a corresponding subframe (i.e. a UE DL/UL CC set) among candidate CCs for an LTE-A UE supporting CA. The PDCCH monitoring set indication provides information about a PDCCH monitoring set for the UE. The UE can perform BD only on the CCs of the PDCCH monitoring set. The PDCCH monitoring set indication may represent the indexes of carriers on which BD is to be performed or a bitmap with as many bits as the size of the UE DL CC set, indicating CCs set as the PDCCH monitoring set within the UE DL CC set.

The scheduled CC indication indicates CCs scheduled in the subframe, from among the candidate CCs of the UE. For example, the scheduled CC indication may specify CCs scheduled in the corresponding transmission interval by means of the carrier indexes or bitmap of the UE DL/UL CC set.

The DL CCs of the UE DL CC set of the UE may differ in BW or transmission mode. Therefore, the BW and/or transmission mode indication indicates the BWs and/or transmission modes of the DL CCs, thereby reducing the PDCCH BD complexity of the UE.

The CCE aggregation level parameter indicates the CCE aggregation level of a PDCCH transmitted on each CC. CCE aggregation levels may be indicated directly or by the index of a CCE aggregation level subset.

The LTE-A system may predefine the number of candidate PDCCHs for each CCE aggregation level. An eNB supporting the LTE-A system may adjust the number of candidate PDCCHs and indicate the adjusted number of candidate PDCCHs to a UE by the number of candidate PDCCHs indication, irrespective of the number of candidate PDCCHs used in the legacy LTE system.

Additionally, the LTE-A system may determine the number of candidate PDCCHs for each CCE aggregation level. The eNB may directly indicate a PDCCH carrying a control channel to a UE by the index of a candidate PDCCH from among candidate PDCCHs or may indicate the PDCCH in a bitmap of several candidate PDCCHs.

In the LTE-A system, UE ID types of UEs that can receive PDCCHs are configured by higher layer signaling. According to UE ID types, DCI format types for BD may be different. In addition, a DCI format for BD is also different for each transmission mode. Therefore, the eNB may enable a UE to perform BD on fewer DCI formats than reference DCI formats according to a corresponding UE ID or transmission mode, using DCI format information set in the DCI format parameter.

CFI values are CFIs for carriers corresponding to a candidate CC set. The eNB may transmit CFIs corresponding to the carriers of a UE DL CC set to the UE so as to minimize the UE's PCFICH detection errors in the DL CCs of the UE DL CC set.

Alternatively, the eNB may transmit only the CFIs of DL CCs included in the UE DL CC set but not included in the PDCCH monitoring set to the UE. In this case, the UE may decode the CFIs of the PDCC monitoring set using the PCFICH. If there is no error in the CRC of a PDCCH on a corresponding DL CC, it can be said that the UE succeeds in decoding the PCFICH. Therefore, the eNB transmits only the CFIs of the other CCs, to thereby reduce additional overhead.

A part of the parameters and/or information included in the CF may be transmitted dynamically at every transmission time, whereas the remaining part of the parameters and/or information included in the CF may be transmitted semi-statically. In addition, the parameters and/or information included in the CF may be transmitted UE-specifically, UE group-specifically, cell-specifically, and/or carrier-specifically according to their purposes. The term 'CF' used in the embodiments of the present invention may be replaced with any other term signifying the same function.

A description will be given below of parameters and/or information included in the CF, in case of joint coding of PDCCHs to transmit control signals in FIG. 13.

When jointly coded PDCCHs are transmitted only on a specific carrier (a UE-specific primary CC if a UE has prior knowledge of a specific CC carrying a control channel) from among candidate carriers, the eNB may transmit information about the number of scheduled CCs, information about a DCI format, information about a CCE aggregation level, etc. in the CF to the UE.

In FIG. 13, the CF may be used irrespective of a PDCCH coding scheme. For example, the eNB may transmit the aggregation level of each carrier or the index of a candidate aggregation level subset available to carriers in the CF to the UE by semi-static signaling such as broadcast information or RRC signaling or by dynamic signaling. Thus, the BD complexity of the UE can be reduced.

Table 2 illustrates an example of candidate aggregation level subsets.

TABLE 2

| Subset index | bit | Aggregation level subset |
|---|---|---|
| 0 | 00 | {1, 2} |
| 1 | 01 | {2, 4} |
| 2 | 10 | {1, 2, 4} |
| 3 | 11 | {4, 8} |

To signal the index of a CCE aggregation level subset to the UE in the LTE-A system, the eNB may use CCE aggregation levels {1, 2, 4, 8} used in the LTE system. 2 bits are required to represent CCE aggregation level subsets. As four subset indexes can be represented in 2 bits, the LTE-A system can support scheduling flexibility for an arbitrary carrier by using the same number of bits used in the LTE system.

Table 2 illustrates an example of candidate aggregation level subsets. Other various aggregation level subsets may be created using one or more CCE aggregation level elements of the LTE system.

FIG. 13 will now be described based on the above description.

The eNB may select a transmission scheme for transmitting a control channel signal (or control signal) on a control channel to a UE (S1300).

In step S1300, the eNB may select a control signal transmission scheme by encoding control channel signals in the afore-described coding schemes.

In this manner, a BD method may be determined for the UE according to the control signal transmission scheme. Accordingly, the eNB may transmit a CF containing CA information and/or information about the control signal transmission scheme (i.e. the control signal coding scheme) to the UE. The CF may include the afore-described parameters and information (S1310).

The eNB may transmit the CF to the UE by RRC signaling. Needless to say, the CF may be transmitted in various methods as described later with reference to FIG. 14.

The UE may receive the CF from the eNB and acquire CA information from the CF (S1320).

The eNB may transmit a control signal on a control channel to the UE according to the control signal transmission scheme selected in step S1300 (S1330).

The UE may perform BD to detect the control channel (e.g. a PDCCH) based on the parameters and information included in the CF (S1325).

The UE performs BD on carriers selected based on the CF from a candidate carrier set, instead of all carriers allocated to it, thereby reducing BD complexity.

The UE may detect the control channel by BD and receive a control signal on the detected control channel (S1340).

Figure 14:
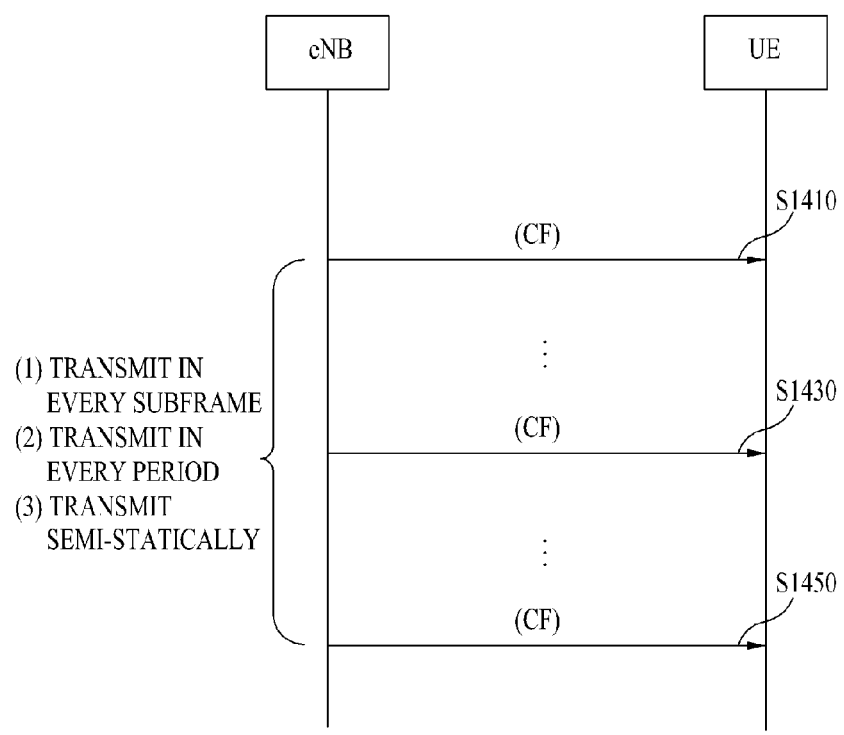
FIG. 14 illustrates various methods for transmitting a CF according to an embodiment of the present invention.

FIG. 14 is a signal diagram illustrating various methods for transmitting a CF according to an embodiment of the present invention.

Referring to FIG. 14, a CF may be transmitted dynamically by L1/L2 control signaling in every subframe or in every TTI (S1410 to S1450). Parameters and/or information included in the CF may be changed dynamically at each transmission time. However, if the CF is dynamically transmitted on a channel that does not support HARQ, such as a PDCCH, it is difficult to determine whether information has been successfully transmitted.

The CF may also be transmitted to a UE semi-dynamically in a predetermined transmission period in FIG. 14. Parameters and/or information included in the CF is valid during the predetermined transmission period (S1410 to S1450).

The CF may also be transmitted to a UE semi-statically by higher-layer signaling in FIG. 14. Information included in the CF may be changed semi-statically (S1410 to S1450). Like RRC signaling, semi-static transmission is performed generally in a long transmission period and supports HARQ. Therefore, it can be determined whether intended information has been successfully transmitted.

When the CF is transmitted by RRC signaling in FIG. 14, it may be transmitted on a UE-specific primary carrier, a UE group-specific primary carrier, or a cell-specific primary carrier according to the purpose of the CF. More specifically, if the CF contains one or more pieces of the above-described information that can reduce BD per UE, the CF may be transmitted on a UE-specific primary carrier.

When the CF is transmitted semi-statically by RRC signaling, a UE may perform BD based on information of the CF, determining that information of the CF is valid until receiving the next CF after the UE receives the CF successfully and transmits an ACK to the eNB (or k subframes after the UE receives the CF, k>1).

In FIGS. 13 and 14, the eNB may transmit the CF in the resources of nCCEs in a specific part of a logical CCE sequence on a UE-specific primary carrier, a UE group-specific primary carrier, or a cell-specific primary carrier or in a specific part of a logical CCE sequence on each carrier. That is, the eNB may transmit the CF at a predetermined fixed position to the UE so that the UE can effectively detect a control channel by first decoding the CF.

For example, an LTE-A eNB may transmit a CF to a UE in the first nCCEs (n≥1) of a logical CCE sequence on a UE-specific primary carrier, a UE group-specific primary carrier, a cell-specific primary carrier, or each carrier.

One thing to note herein is that since the first 16 CCEs are used as a common search space in the LTE system, the common search space of legacy UEs is likely to be reduced. Therefore, when supporting the legacy system, the LTE-A system may use nCCEs of a UE-specific search space following the common search space in a logical CCE sequence for CF transmission. That is, CCEs 0 to 15 may be set for the common search space and n CCEs starting from CCE 16 may be set for a CF transmission area. The CF transmission area is regarded as CCEs of a conventional UE-specific search space and decoded accordingly on the part of legacy UEs. Therefore, there is no problem with backward compatibility.

When the eNB transmits the CF, it may occur that the last CCEs of the logical CCE sequence are not used for PDCCH transmission in a tree structure of CCE aggregation levels. To maximize the utilization of unused CCE resources, nCCEs starting from the last CCE of the logical CCE sequence may be used for CF transmission. That is, given N CCEs in a subframe, they are logically indexed from 0 to N−1 and the indexes of CCEs used for CF transmission are N−1, N−2 . . . N−n.

Figure 15:
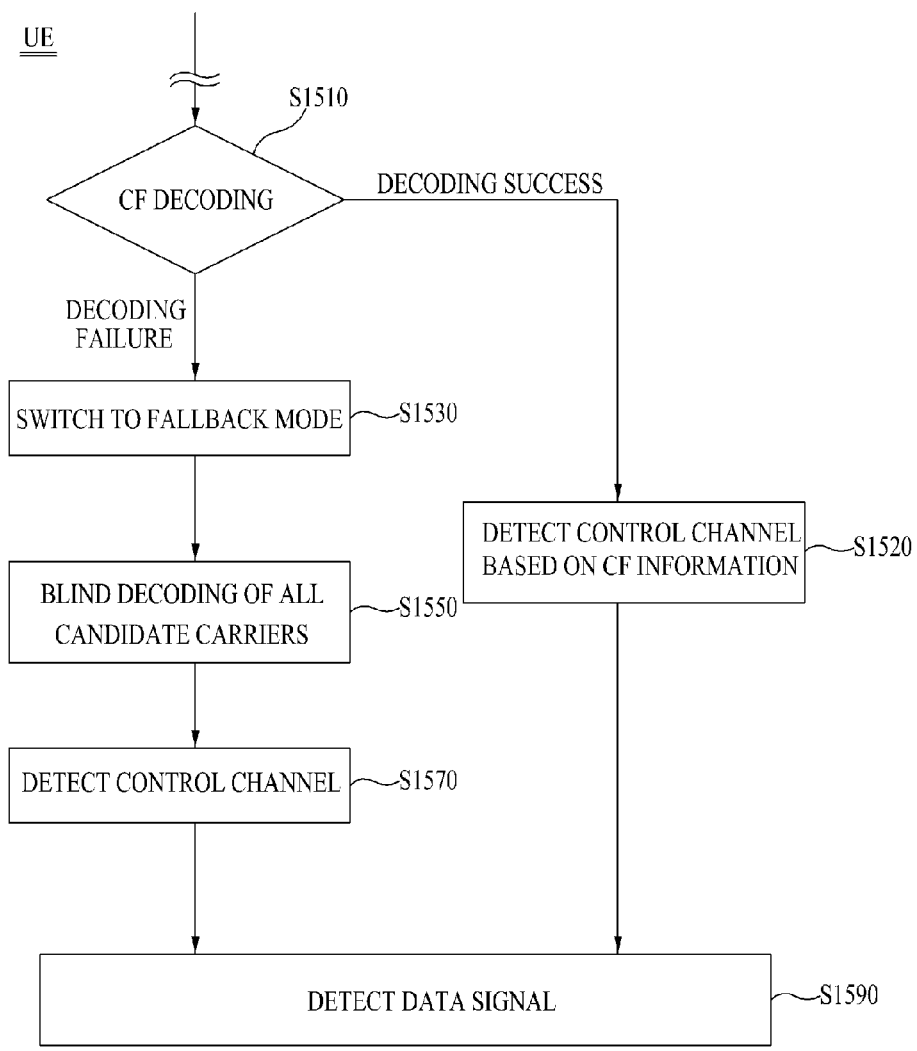
FIG. 15 is a flowchart illustrating an error correction operation when a UE fails in decoding a CF according to an embodiment of the present invention.

FIG. 15 is a flowchart illustrating an error correction operation when a UE fails in decoding a CF according to an embodiment of the present invention.

With reference to FIGS. 13 and 14, the embodiments of reducing BD complexity at a UE have been described and the methods for transmitting a CF to a UE by explicit signaling have been disclosed. These two-step approaches are disadvantageous in that if decoding of control information (e.g. CA information) is failed in step 1, both control information (e.g. a PDCCH signal) and its associated data signal cannot be received in step 2. To solve this error coupling problem, fallback mode may be applied to the embodiments of the present invention.

Referring to FIG. 15, a UE decodes a CF (S1510).

The CF may be transmitted to the UE in every subframe according to a dynamic, a semi-dynamic, or semi-static transmission period, or in a specific subframe with a predetermined transmission period (refer to FIG. 14).

When the UE succeeds in decoding the CF in a subframe in which the UE is supposed to decode the CF, it may detect a control channel (e.g. a PDCCH) based on parameters and/or information included in the CF (S1520).

Upon detection of the control channel, the UE may receive a data channel signal on a data channel using a control signal received on the control channel (S1590).

If the UE fails in decoding the CF in step S1510, the UE switches to fallback mode (S1530).

In the fallback mode, the UE may perform BD on all candidate CCs (S1550).

That is, the UE may search for a control channel by performing BD on all candidate carriers irrespective of the presence or absence of CA information in the CF and the contents of the CA information, in the fallback mode (S1570).

Upon detection of a control channel in step S1570, the UE may detect a data channel signal received on a data channel based on a control channel signal received on the control channel (S1590).

To eliminate error coupling, a CF is preferably transmitted to a UE by higher-layer signaling. If some information elements of the CF need to be dynamically changed in the CF, it is preferred to transmit them to the UE on a PDCCH.

Embodiment 2

Figure 16:
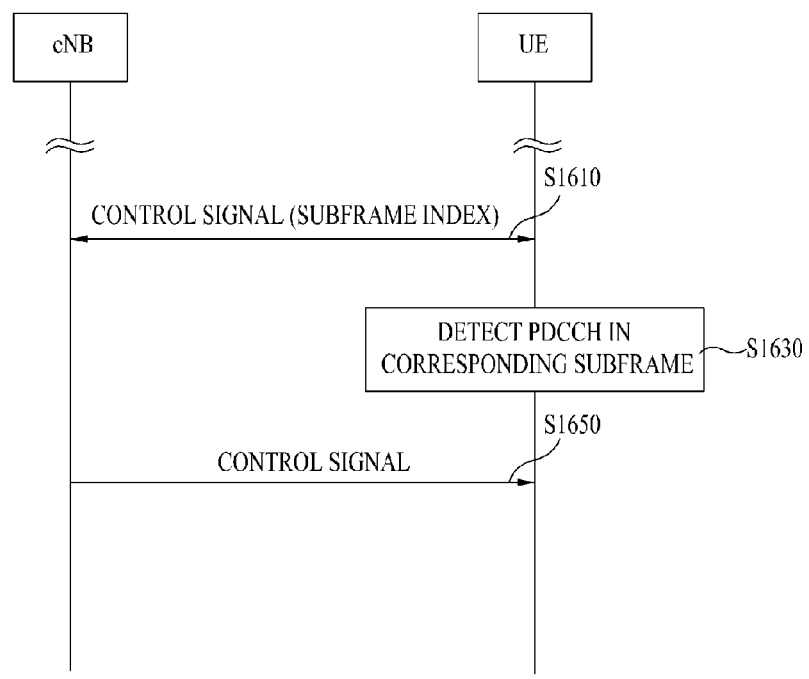
FIG. 16 is a signal diagram illustrating a method for reducing the complexity of blind decoding in the time domain according to another embodiment of the present invention.

FIG. 16 is a signal diagram illustrating a method for reducing BD complexity in the time domain according to another embodiment of the present invention.

With reference to FIGS. 12 to 15, the methods for reducing BD complexity in the frequency domain have been described. In addition to them or independently of them, a method for reducing BD complexity in the time domain may be considered. The following embodiment of the present invention is applicable to a whole PDCCH monitoring set or individual CCs of the PDCCH monitoring set.

In FIG. 16, a UE may perform BD only on an indicated subframe. That is, the UE may perform BD only on a subframe indicated by a subframe index received from the eNB in order to search for a PDCCH and may decode a PCFICH and a PHICH except for the PDCCH in the control regions of the other subframes (refer to FIG. 7 for the description of the control region).

This is done to restrict PHICH reception because if subframe index information received from the eNB does not include n, a PHICH containing control information (e.g. ACK/NACK information) about a PUSCH transmitted in an $(n-4)^{th}$ uplink subframe is transmitted in an $n^{th}$ subframe.

If the eNB adjusts even the timing relationship between a PUSCH transmission subframe and a PHICH reception subframe, the UE may be allowed not to decode the corresponding subframe at all.

If the UE needs to decode none of subframes on a specific CC, the eNB requires a method for indicating a subframe to be decoded to the UE. This function may vary depending on how the UE processes a response for a PDCCH possibly received in a corresponding subframe.

Referring to FIG. 16, the eNB may notify a UE of a procedure for decoding a PDCCH in a specific subframe or a case where a corresponding CC is always applied to an active interval. For example, the eNB may transmit to the UE a control signal indicating a subframe carrying a PDCCH on a corresponding specific carrier or all carriers (S1610).

The eNB may indicate the subframe to be decoded periodically or in a predetermined hopping sequence or bitmap to the UE in step S1610.

The UE may decode a PDCCH only in the indicated subframe, not in the other subframes (S1630).

Herein, the UE may receive a PDCCH control signal on the PDCCH detected in the indicated subframe (S1650).

If the UE fails to receive a control signal in step S1650, the UE may decode a PDCCH at the next PDCCH decoding time.

The following three methods are available for the UE to decode a PDCCH in the operation of FIG. 16.

One of the three methods is that when the UE succeeds in decoding a first PDCCH, it takes PDCCH decoding restriction as a top priority. In this manner, the UE may decode a PDCCH in every subframe. The UE may continue this operation until receiving another subframe index.

Another PDCCH decoding method is that if an HARQ process for traffic is completed on the downlink or the uplink during PDCCH decoding, the UE may attempt PDCCH decoding according to the original PDCCH restriction rule.

The other PDCCH decoding method is that even though the UE succeeds in PDCCH decoding, the UE may decode a PDCCH only in a subframe indicated by a subframe index, without decoding a PDCCH in the next subframe.

A method for being released from the PDCCH decoding rule described in FIG. 16 at a UE to which the eNB has indicated PDCCH decoding will be described. The UE that has received a subframe index in step S1610 decodes a PDCCH only in a subframe indicated by the subframe index. The eNB may transmit to the UE explicit release control information regarding the indication of step S1610 by L2 or higher-layer signaling. That is, upon receipt of the explicit release control information, the UE may decode PDCCHs in the subframe indicated in step S1610 and all other subframes.

Embodiment 3

The embodiments of the present invention illustrated in FIGS. 12 to 16 are performed by explicit signaling. On the other hand, the relationship between carriers may be used without explicit signaling, to thereby reduce the BD complexity of a UE. That is, a method for fundamentally reducing BD complexity at a UE in decoding a plurality of UE-specific PDCCHs on one or more downlink carriers will be described.

In accordance with this embodiment, the BD complexity of a UE can be reduced by restricting a CCE aggregation level, the number of candidate PDCCHs, and/or a starting CCE position. In general, a search space in which a UE performs BD may be determined based the CCE aggregation level of each carrier and a UE IE such as a C-RNTI.

Hereinbelow, a description is given of implicit methods for reducing the BD complexity of a UE.

CCE aggregation level restriction in frequency domain

A CCE aggregation level may be restricted in various methods to efficiently reduce the total number of BDs that a UE attempts in a search space.

1. If each carrier has the same CCE aggregation level, the UE does not need to search for PDCCHs on different carriers using different CCE aggregation levels, thereby reducing the number of PDCCH searches. Therefore, BD overhead can be decreased.

However, if all carriers are limited to the same CCE aggregation level, there may be problems with scheduling of each carrier. That is, the same amount of CCE resources should be scheduled for a UE-specific search space on all carriers irrespective of the traffic situation of each carrier.

Accordingly, it is preferred to set a different CCE aggregation level for each carrier according to a channel environment or the purpose of each carrier. Compared to LTE UEs that perform BD according to a CCE aggregation level subset $\{1, 2, 4, 8\}$, LTE-A UEs supporting CA may be limited to perform BD only for two or three adjacent CCE aggregation levels such as $\{1, 2\}, \{2, 4\}, \{4, 8\}, \{1, 2, 4\}$ or $\{2, 4, 8\}$. Thus, the BD complexity of the UEs can be reduced.

In the case where a UE-specific PDCCH is detected through BD on a downlink carrier (a UE-specific primary carrier or a cell-specific primary carrier) serving as a reference downlink carrier, for all aggregation levels, a CA group with two or three CA levels including a CA level at which the PDCCH has been detected on the downlink carrier is selected according to an arbitrary rule and the other PDCCH BDs are restricted to the CCE CA level group.

2. To reduce the search complexity of LTE-A UEs supporting CA, the eNB may allow only limited and fixed CCE aggregation levels to UEs that decode PDCCHs in UE-specific search areas.

3. The eNB may set separate CCE aggregation levels for a primary carrier and a secondary carrier for each UE. That is, an LTE-A UE performs BD like a legacy UE on a reference carrier (i.e. a primary carrier) and is limited to perform decoding on the other candidate carriers only using specific aggregation levels adjacent to the aggregation level detected from the reference carrier.

4. The eNB may allow an LTE-A UE to perform BD on a reference carrier in the same manner as an LTE UE and may restrict the LTE-A UE to decoding based on a specific CCE aggregation level subset preset between the eNB and the UE on the other subcarriers.

5. In the legacy (LTE) system, the number of candidate PDCCHs is preset for each CCE aggregation level. For instance, if CCE aggregation levels are $\{1, 2, 4, 8\}$, the numbers of candidate PDCCHs are given as $\{6, 6, 2, 2\}$. Fewer PDCCHs than for legacy UEs may be allocated to LTE-A UEs supporting CA, thus reducing the number of BD attempts for the LTE-A UEs.

That is, given the CCE aggregation levels of $\{1, 2, 4, 8\}$, smaller numbers of candidate PDCCHs than the numbers of candidate PDCCHs $\{6, 6, 2, 2\}$ allocated to legacy UEs may be allowed to LTE-A UEs, such as $\{4, 4, 4, 4\}, \{3, 3, 1, 1\}, \{4, 4, 1, 1\}, \{3, 3, 2, 2\}$ or $\{4, 4, 2, 1\}$.

As limitation is imposed on the control channel search of an LTE-A UE in the above various CCE aggregation level restriction methods, the LTE-A UE may have accurate BD performance according to its capability.

CCE Aggregation Level Restriction in Time Domain

A CCE aggregation level may be restricted on a subframe basis along the time axis as well as on a carrier basis along the frequency axis.

For example, a UE may be supposed to perform BD on a carrier in an arbitrary $n^{th}$ subframe, for all CCE aggregation levels. The arbitrary subframe refers to a subframe in which an LTE-A UE has successfully detected an initial PDCCH using its allocated CA information after an RRC connection is established. That is, if the UE succeeds in detecting a PDCCH in a specific subframe, the subframe becomes a reference for a subsequent PDCCH decoding operation. The search spaces of subsequent subframes may be adjusted based on the specific subframe.

If the LTE-A UE succeeds in BD at CCE aggregation level 'b' in an $n^{th}$ subframe, it continues using CCE aggregation level 'b' in the next $(n+1)^{th}$ to $(n+k)^{th}$ subframes. Therefore, the number of BD attempts can be decreased. However, this method faces the scheduling constraint that the specific CCE aggregation level (b) should be continuously used in the k subframes following the $n^{th}$ subframe.

To render this method more flexible in scheduling, the UE may be restricted to one or two CCE aggregation levels adjacent to the successful CCE aggregation level of the $n^{th}$ subframe, when performing BD in the $(n+1)^{th}$ to $(n+k)^{th}$ subframes. That is, if the UE succeeds in decoding at CCE aggregation level '2' in the $n^{th}$ subframe, it is supposed to perform BD in the $(n+1)^{th}$ to $(n+k)^{th}$ subframes, at one or two adjacent aggregation levels including CCE aggregation level '2', such as {1, 2}, {1, 2, 4}, {2, 4, 8}, or {2, 4}. Thus, the complexity of BD for detecting a control channel at the UE can be reduced.

Fixing Starting CCE Position

In the case where a UE-specific PDCCH BD starting point is set for each downlink carrier (it is obvious that a starting point may be set independently for each CCE aggregation level), the starting point varies with a carrier according to a hash function using the index of the carrier as an input parameter. In contrast, the same UE-specific starting point is set for each carrier, instead of using the index of the carrier as an input parameter of a hash function in the CCE starting point fixing method according to the embodiment of the present invention.

That is, to reduce the search complexity of BD, the same CCE starting position may be defined for each carrier. It is assumed that LTE UEs and LTE-A UEs are co-existent. In this case, the LTE UEs and the LTE-A UEs do not need to perform decoding independently in search spaces of each carrier due to the same CCE starting position of each carrier.

If a search space starting position is calculated in a different manner only for the LTE-A UEs supporting CA, scheduling freedom may be increased without affecting the existing LTE UEs.

For instance, in addition to a CCE aggregation level and a UE ID, other multi-carrier parameters such as a carrier index may be used in calculating a search space starting position.

In another method for reducing the BD complexity of LTE-A UEs, the LTE-A UEs may perform BD on a reference carrier in the same manner as LTE UEs and may then perform BD on the other carriers based on the BD result of the reference carrier.

For instance, it is assumed that an LTE-A UE succeeds in BD of CCE 20 at aggregation level '1' on an LTE-A UE-specific reference carrier in the same manner as an LTE UE. Then the LTE-A UE may attempt BD of fewer candidate PDCCHs than six candidate PDCCHs of the reference carrier, for example, one of {1, 2, 3, 4, 5}, starting from the same position CCE 20, on candidate carriers other than the reference carrier.

If decoding is successful on the reference carrier according to CCE aggregation levels '1' and '2', the number of candidate PDCCHs is to be smaller than 6, that is, {1, 2, 3, 4, 5}. If the successful CCE aggregation levels are '4' and '8', the number of candidate PDCCHs is set to {1} smaller than 2. Thus, BD complexity can be reduced in relation to CCE aggregation levels.

In a further method, a starting CCE index may be set for decoding on the other candidate carriers by applying specific offsets from a decoding-successful CCE index of a reference carrier to the candidate carriers. Even though different starting positions are set for different carriers, the numbers of candidate PDCCHs may also be limited for the carriers.

Embodiment 4

Embodiment 4 is basically identical to embodiment 1, except that they are different in terms of the function of a CF, control information included in the CF, and a UE's BD method. The following description is given mainly focusing on the difference from embodiment 1.

Information indicated on a reference downlink carrier (e.g. a UE-specific primary carrier, a UE group-specific primary carrier, or a cell-specific primary carrier) as an attribute of control information in a CF may contain information about the reference downlink carrier and information about a PDCCH in a logical CCE sequence or physical resources.

The PDCCH position information may be information about the position of a UE-specific PDCCH (meaning a DL/UL grant, but a UE-group common or cell-common PDCCH in a special case) in a logical CCE sequence or physical resources within the PDCCH transmission physical resources of another downlink carrier, a candidate in a fixed CCE sequence of a UE search space, or a specific aggregation level or specific range of aggregation levels. The information about the PDCCH position in a CCE sequence may further include information about the position of another UE-specific PDCCH for the UE in a logical CCE sequence or physical resources of the reference downlink carrier or the afore-described other information about another UE-specific PDCCH.

Considering the attribute of the control information of the CF, the information about the position of the PDCCH in a logical CCE sequence or physical resources or the above-defined other information may be processed as the difference of the position of another UE-specific PDCCH for the UE in a logical CCE sequence or physical resources with respect to the position of the reference PDCCH or information about available offsets from an aggregation level.

In an extreme case of design, the position of the PDCCH in a logical CCE sequence or physical resources of the reference downlink carrier may be the same as the position of another PDCCH transmitted on another downlink carrier or may be a resource position to which a CCE or physical resource offset is applied (the offset may be common to the downlink carrier or specific to the downlink carrier based on the index of the carrier). Or it may be defined using the same CCE aggregation level in an extreme case.

In addition, a specific bit-length state of information carried in the CF may be used to indicate the presence or absence of a PDCCH for a UE on a corresponding carrier.

The CF may be channelized as a dedicated physical control channel and mapped to physical resources in the same manner as a downlink PHICH or PCFICH, before CCE-to-RE mapping involved in general PDCCH transmission. The CF may also be defined as a PDCCH-type physical channel and thus used in a specific DIC format. Although physical channels carrying the CF may be defined and transmitted basically in a subframe carrying a UE-specific PDCCH to which the control information is applied, considering the delay involved in the 2-step decoding approach for UE-specific PDCCH BD, they may be transmitted in advance in a $P^{th}$ (>0) subframe previous to the subframe carrying the UE-specific PDCCH. The starting subframe to which the control information is applied may be preset between a cell/eNB and a UE.

If a UE-specific carrier is allocated through a PDCCH or another dedicated physical control channel irrespective of whether the UE-specific carrier allocation is done by RRC signaling, the CF may be defined and included in payload as the DCI format of the control channel and the UE-specific carrier assignment may be transmitted through the PDCCH in the DCI format. That is, one or more pieces of first control information are transmitted on a specific PDCCH. In this method, information that eliminates BD or obscurity and scheduling information are simultaneously received by receiving the corresponding control information. Considering that the PDCCH is used basically as means for delivering scheduling information and a UE performs BD according to an expected length of the scheduling information, it is preferable to include a fixed number of pieces of CF information. Because a PDCCH may be rather a factor that increases the BDs of the UE in all proposals in which the CF used for BD of the UE-specific PDCCH for the UE is included in the PDCCH, the position of the PDCCH in a logical CCE sequence, the area of the PDCCH, or the position of the PDCCH in physical resources may be limited. That is, when the first control information is included, it is preferred to enable the UE to detect the PDCCH at a specific position (i.e. a position according to a logical bit order or a position in physical resources) irrespective of the structure of other information in order to minimize the amount of information that the UE should acquire and to allow the UE to find the information earlier than the other information.

Methods that can be used in combination with or independently of the above method may be limited to cases where the CCE aggregation level of the PDCCH is restricted. The position of the PDCCH in a logical CCE sequence may be a fixed-numbered position or a restricted area in a PDCCH candidate area (i.e. it may be defined as a UE-specific search space, differently or equally for each CCE aggregation level) defined as a starting point for the UE in a subframe. Or the position of the PDCCH in a logical CCE sequence may be a fixed position or a restricted area in a total absolute CCE sequence.

Embodiment 5

In Embodiment 1 to Embodiment 4, the CF is transmitted on another dedicated physical control channel or another PDCCH before decoding of a UE-specific PDCCH, so that the CF can be decoded first of all. In contrast, a different CF is defined in the context of a 1-step approach for UE-specific PDCCH decoding in Embodiment 5.

A UE acquires a UE-specific PDCCH (meaning a DL/UL grant or when needed, a common PDCCH for one or more UEs) transmitted on a reference carrier which is a UE-specific primary carrier, a UE group-specific primary carrier, or a cell-specific carrier, by conventional BD.

Direct or indirect control information that can mitigate or eliminate BD overhead on downlink carriers carrying the other PDCCHs may be defined and included in payload defined in the DCI format of a corresponding PDCCH in any of the methods for defining control information as a CF. The control information included in the payload serves to prevent possible obscurity involved in BD and reception of control information (e.g. scheduling information, etc.) at the UE. The types and configuration schemes of information included in the payload can be determined in any of the afore-described CF-related methods.

When the number of BDs at a UE is to be reduced by one or more pieces of control information, it is difficult to configure all of the control information according to a 1-step transmission scheme. Therefore, some of the control information is transmitted by higher-layer signaling. This control information may be subjected to semi-static change and only essential element control information is defined in a DCI format. In this case, the CF is dynamically changed but only partially adjusted.

On the other hand, the payload defined in the DCI format of the UE-specific PDCCH for the UE (a DL/UL grant or when needed, a UE group-specific PDCCH or a cell-specific PDCCH), serving as a reference, may include the indexes of carriers carrying other PDCCHs and/or control information indicating the positions or areas of the other PDCCHs in a logical CCE sequence or in physical resources in order to mitigate or eliminate the BD overhead of the other PDCCHs.

If two or more PDCCHs are transmitted to a UE, the payload of a UE-specific PDCCH serving as the above reference may include control information that mitigates or eliminates the BD overhead of all other PDCCHs destined for the UE. In a further method, if three or more PDCCHs are transmitted to a UE, linkage may be established among the PDCCHs based on their orders such as their carrier indexes by including the carrier index of a PDCCH of the next order and/or control information indicating the position or area of the PDCCH of the next order in a logical CCE sequence or in physical resources in the payload of an arbitrary UE-specific PDCCH.

Figure 17:
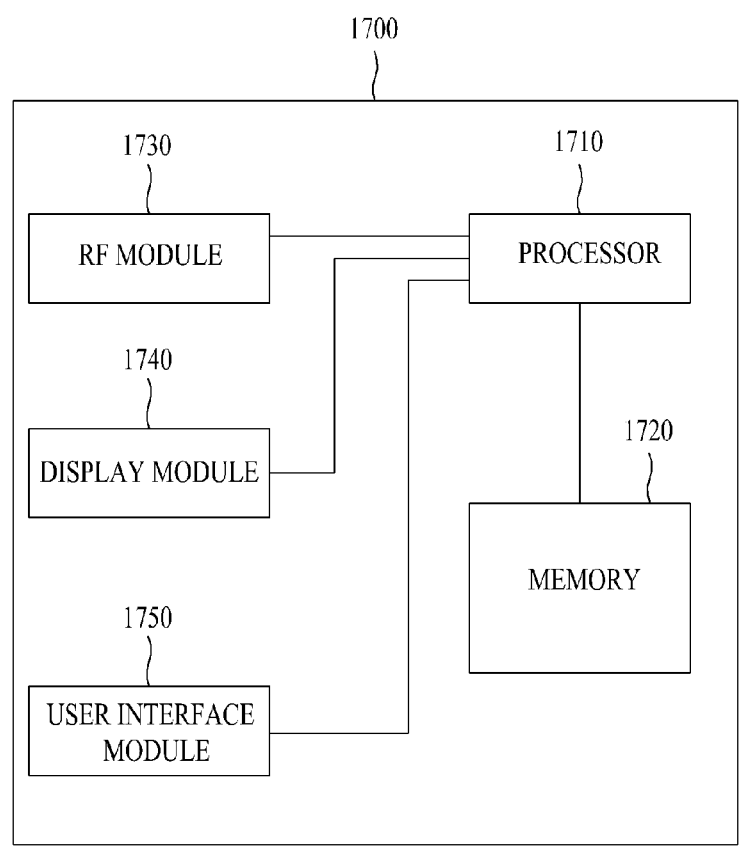
FIG. 17 is a block diagram of a transmitter and a receiver for implementing the embodiments of the present invention.

FIG. 17 is a block diagram of a transmitter and a receiver for implementing the embodiments of the present invention.

Referring to FIG. 17, a transceiver 1700 includes a processor 1710, a memory 1720, an RF module 1730, a display module 1740, and a user interface module 1750. The configuration of the transceiver 1700 is purely exemplary. Thus a module may be omitted from the transceiver 1700 or a necessary module may be added to the transceiver 1700. In addition, a certain module of the transceiver 1700 may be divided into a plurality of modules. The processor 1710 is adapted to perform operations according to the embodiments of the present invention described before or not described with reference to the drawings. More specifically, if the transceiver 1700 is a part of an eNB, the processor 1720 may generate a control signal and map the control signal to control channels configured within a plurality of CCs. If the transceiver 1700 is a part of a UE, the processor 1720 may detect a control channel destined for the UE from signals received on a plurality of CCs and extract a control signal from the control channel. Then the processor 1720 may perform a necessary operation based on the control signal. Especially, the processor may implement the protocol architecture described in FIG. 2 in the embodiments of the present invention. That is, the processor may carry out the functions of various layers on the user plane or on the control plane.

For details of the processor 1720, the embodiments of the present invention described before with reference to FIGS. 2 to 16 and Embodiment 1 to Embodiment 5 may be referred to. The memory 1720 is connected to the processor 1710 and stores an operating system, applications, program code, data, etc. The RF module 1730 is connected to the processor 1710 and upconverts a baseband signal to an RF signal or downconverts an RF signal to a baseband signal. For this purpose, the RF module 1730 performs analog conversion, amplification, filtering, and frequency upconversion, or performs these operations reversely. The display module 1740 is connected to the processor 1710 and displays various types of information. The display module 1740 may be configured using, but not limited to, an LCD (Liquid Crystal Display), an LED (Light Emitting Diode), an OLED (Organic Light Emitting Diode), etc. The user interface module 1750 is connected to the processor 1710 and may be configured into a combination of known user interfaces such as a keypad, a touch screen, etc.

Accordingly, the invention should not be limited to the specific embodiments described herein, but should be accorded the broadest scope consistent with the principles and novel features disclosed herein.

INDUSTRIAL APPLICABILITY

The above-described methods for decoding a control channel and a UE structure for implementing the control channel decoding methods have been described in the context of a 3GPP LTE-A system. However, the present invention is also applicable to other various wireless access systems including a 3GPP system, a 3GPP LTE system, a 3GPP2 and/or an IEEE 802.xx (Institute of Electrical and Electronic Engineers 802) system. In addition, the embodiments of the present invention can be applied to all technical fields being applications of the various wireless access systems as well as the various wireless access systems.

The invention claimed is:

1. A method for detecting a control channel in a carrier aggregation system, the method performed by a terminal supporting the carrier aggregation system and comprising:
receiving a first control signal including carrier information indicating candidate carriers allocated to the terminal among two or more carriers used for the carrier aggregation system;
performing blind decoding on only the candidate carriers among the two or more carriers based on the carrier information to detect the control channel, without blind decoding all of the two or more carriers; and
receiving a second control signal on the detected control channel,
wherein a primary carrier of the candidate carriers is blind decoded using a same CCE (Control Channel Element) aggregation level as a legacy terminal which does not support the carrier aggregation system, and one or more secondary carriers of the candidate carriers are blind decoded using aggregation levels adjacent to the aggregation level of the primary carrier, and
wherein the first control signal is allocated between a 17th CCE and a (17+N)th CCE, and CCEs between a first CCE and 16th CCE are allocated for both the terminal and the legacy terminal.

2. The method according to claim 1, wherein the first control signal includes a number of scheduled CCs (Component Carriers) indication parameter, a PDCCH (Physical Downlink Control Channel) monitoring set indication, a scheduled CC indication, a bandwidth and transmission mode indication, a CCE (Control Channel Element) aggregation level, a number of candidate PDCCHs, indexes of the candidate PDCCHs, a DCI (Downlink Control Information) format indication or CFI (Control Format Indicator) values for candidate carrier sets.

3. The method according to claim 1, wherein the carrier information includes information indicating a carrier to which the control channel allocated to the terminal is allocated, information about candidate carriers for transmitting a data channel to the terminal, information indicating an area or a carrier in which the terminal is to perform the blind decoding or information indicating an aggregation level of each of the two or more carriers.

4. The method according to claim 1, wherein the control channel is a Physical Downlink Control Channel (PDCCH).

5. The method according to claim 1, wherein the first control signal is a first PDCCH (Physical Downlink Control Channel) signal transmitted on a PDCCH.

6. The method according to claim 1, wherein the first control signal is transmitted by Radio Resource Control (RRC) signaling.

7. The method according to claim 1, wherein when decoding of the first control signal fails, the control channel is detected by performing blind decoding on all candidate carriers allocated to the terminal.

8. A terminal for detecting a control channel in a carrier aggregation system, the terminal comprising:
a radio Frequency (RF) module for transmitting and receiving a radio signal; and
a processor for detecting the control channel,
wherein the processor is configured to:
receive a first control signal including carrier information indicating candidate carriers allocated to the terminal among two or more carriers used for the carrier aggregation system;
perform blind decoding on only the candidate carriers among the two or more carriers based on the carrier information to detect the control channel, without blind decoding all of the two or more carriers; and
receive a second control signal on the detected control channel,
wherein a primary carrier of the candidate carriers is blind decoded using a same CCE (Control Channel Element) aggregation level as a legacy terminal which does not support the carrier aggregation system, and one or more secondary carriers of the candidate carriers are blind decoded using aggregation levels adjacent to the aggregation level of the primary carrier, and
wherein the first control signal is allocated between a 17th CCE and a (17+N)th CCE, and CCEs between a first CCE and 16th CCE are allocated for both the terminal and the legacy terminal.

9. The terminal according to claim 8, wherein the first control signal includes a number of scheduled CCs (Component Carriers) indication parameter, a PDCCH (Physical Downlink Control Channel) monitoring set indication, a scheduled CC indication, a bandwidth and transmission mode indication, a CCE (Control Channel Element) aggregation level, a number of candidate PDCCHs, indexes of the candidate PDCCHs, a DCI (Downlink Control Information) format indication or CFI (Control Format Indicator) values for candidate carrier sets.

10. The terminal according to claim 8, wherein the carrier information includes information indicating a carrier to which the control channel allocated to the terminal is allocated, information about candidate carriers for transmitting a data channel to the terminal, information indicating an area or a carrier in which the terminal is to perform the blind decoding or information indicating an aggregation level of each of the two or more carriers.

11. The terminal according to claim 8, wherein the control channel is a Physical Downlink Control Channel (PDCCH).

12. The terminal according to claim 8, wherein the first control signal is a first PDCCH (Physical Downlink Control Channel) signal transmitted on a PDCCH.

13. The terminal according to claim 8, wherein the first control signal is transmitted by Radio Resource Control (RRC) signaling.

14. The terminal according to claim 8, wherein when decoding of the first control signal fails, the processor of the terminal detects the control channel by performing blind decoding on all candidate carriers allocated to the terminal.

15. The method according to claim 1,
wherein the second control signal is jointly encoded from both a first control channel of a first carrier of the two or more carriers and a second control channel of a second carrier of the two or more carriers, and
wherein the terminal simultaneously transceives the signals on the first carrier and the second carrier based on the second control signal.

16. The terminal according to claim 8,
wherein the second control signal is jointly encoded from both a first control channel of a first carrier of the two or more carriers and a second control channel of a second carrier of the two or more carriers, and wherein the terminal simultaneously transceives the signals on the first carrier and the second carrier based on the second control signal.

17. The method according to claim 1, wherein the blind decoding is performed using aggregation levels adjacent to the aggregation level of the Kth subframe between (K+1)th subframe and (K+L)th subframe when the blind decoding is successfully performed at the Kth subframe.

18. The terminal according to claim 8, wherein the processor is further configured to perform the blind decoding using aggregation levels adjacent to the aggregation level of the Kth subframe between (K+1)th subframe and (K+L)th subframe when the blind decoding is successfully performed at the Kth subframe.

* * * * *